US012802606B2

(12) United States Patent
Xu et al.

(10) Patent No.: US 12,802,606 B2
(45) Date of Patent: Nov. 17, 2026

(54) PARTITION COMPENSATION METHOD AND ELECTRONIC DEVICE

(71) Applicant: Huawei Technologies Co., Ltd., Shenzhen (CN)

(72) Inventors: Kai Xu, Shenzhen (CN); Jialiang Sun, Shenzhen (CN); Zheng Gong, Shanghai (CN); Shiyan Song, Shanghai (CN); Xingtang Rao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/686,182

(22) PCT Filed: Aug. 12, 2022

(86) PCT No.: PCT/CN2022/112285
§ 371 (c)(1),
(2) Date: Feb. 23, 2024

(87) PCT Pub. No.: WO2023/024941
PCT Pub. Date: Mar. 2, 2023

(65) Prior Publication Data

US 2026/0155075 A1 Jun. 4, 2026

(30) Foreign Application Priority Data

Aug. 26, 2021 (CN) ......................... 202110988590.3

(51) Int. Cl.
*G09G 3/20* (2006.01)
*G09G 3/3208* (2016.01)

(52) U.S. Cl.
CPC ......... *G09G 3/2007* (2013.01); *G09G 3/3208* (2013.01); *G09G 2310/04* (2013.01);
(Continued)

(58) Field of Classification Search
None
See application file for complete search history.

(56) References Cited

U.S. PATENT DOCUMENTS 10,997,898 B2 * 5/2021 Wang .................. G09G 3/3291
11,386,832 B1 * 7/2022 Yoo ...................... G09G 3/2096
(Continued)

FOREIGN PATENT DOCUMENTS

CN 101523471 A 9/2009
CN 110383369 A 10/2019
(Continued)

*Primary Examiner* — Dorothy Harris
(74) *Attorney, Agent, or Firm* — Conley Rose, P.C.

(57) ABSTRACT

A partition compensation method and an electronic device includes one or more processors and a display having a display driver chip and a display panel. The one or more processors are configured to send a first image and first compensation data to the display driver chip. The display driver chip is configured to map a first gray level of the first image to a second gray level, where the second gray level is less than the first gray level. The display driver ship is also configured to adjust first brightness of a second image in a first display area of the first image based on the first compensation data and the second gray level. The display panel is configured to display, in the first display area, an adjusted second image.

24 Claims, 13 Drawing Sheets

(52) U.S. Cl.
CPC ............... *G09G 2320/0233* (2013.01); *G09G 2320/0257* (2013.01); *G09G 2320/043* (2013.01); *G09G 2340/0435* (2013.01)

(56) References Cited

U.S. PATENT DOCUMENTS

| | | | | |
|---|---|---|---|---|
| 2005/0280615 | A1* | 12/2005 | Cok | G09G 3/3216 345/77 |
| 2011/0199395 | A1* | 8/2011 | Nathan | G09G 3/3241 345/82 |
| 2016/0148559 | A1* | 5/2016 | Kim | G09G 3/3208 345/76 |
| 2016/0155384 | A1 | 6/2016 | Kim et al. | |
| 2016/0379551 | A1* | 12/2016 | Zhuang | G09G 3/3208 345/520 |
| 2017/0042002 | A1* | 2/2017 | Asamura | H05B 45/22 |
| 2017/0061903 | A1* | 3/2017 | Yata | G09G 3/3607 |
| 2018/0336827 | A1* | 11/2018 | Zahirovic | H04N 5/57 |
| 2020/0357336 | A1* | 11/2020 | Xu | G09G 3/3233 |
| 2022/0122500 | A1* | 4/2022 | Wai | G09G 3/2014 |
| 2022/0343845 | A1* | 10/2022 | Wu | G09G 3/035 |

FOREIGN PATENT DOCUMENTS

| | | | | |
|---|---|---|---|---|
| CN | 110808006 | A | 2/2020 | |
| EP | 2453433 | A2 | 5/2012 | |
| WO | WO-2020169036 | A1 * | 8/2020 | G09G 3/3208 |
| WO | 2020232588 | A1 | 11/2020 | |
| WO | WO-2021043143 | A1 * | 3/2021 | G09G 3/035 |

* cited by examiner

PARTITION COMPENSATION METHOD AND ELECTRONIC DEVICE

CROSS-REFERENCE TO RELATED APPLICATIONS

This application is a National Stage of International Patent Application No. PCT/CN2022/112285 filed on Aug. 12, 2022, which claims priority to Chinese Patent application Ser. No. 202110988590.3 filed on Aug. 26, 2021. Both of the aforementioned applications are hereby incorporated by reference in their entireties.

TECHNICAL FIELD

This application relates to the field of display technologies, and in particular, to a partition compensation method and an electronic device.

BACKGROUND

Currently, a display usually uses an organic material like an organic light-emitting diode (organic light-emitting diode, OLED), an active-matrix organic light-emitting diode (active-matrix organic light-emitting diode, AMOLED) to emit light. However, with use of the display, the organic material attenuates, and a problem like aging or screen burn-in occurs. In particular, different display areas may have different use time, resulting in uneven aging of the different display areas of the display. For example, in a smart cover mode, a display area that is of the display and that is not covered by a smart cover has longer use time and a higher aging degree. Alternatively, a primary screen of a foldable display has longer use time than a secondary screen, and therefore an aging degree of the primary screen is higher than that of the secondary screen, and aging is more serious. If the display is not compensated, the aging is more serious, and problems such as uneven light emitting, low use efficiency, a yellowish display color, high power consumption, and a short service life occur. In addition, aging is more uneven, and product availability is not high.

SUMMARY

Embodiments of this application provide a partition compensation method and an electronic device, so that compensation can be separately performed on different display areas, an aging compensation effect is better, and uneven aging of a display is effectively alleviated.

According to a first aspect, an embodiment of this application provides an electronic device, including an application processor AP and a display, where the display includes a display driver chip DDIC and a display panel. The AP is configured to send a first image and first compensation data to the DDIC; the DDIC is configured to map a first gray level of the first image to a second gray level, where the second gray level is less than the first gray level; the DDIC is configured to adjust brightness of a second image in a first display area of the first image based on the first compensation data and the second gray level; and the display panel is configured to display, in the first display area, a second image of which brightness is adjusted.

In some embodiments, the first display area is any display area of the first image.

In this application, the DDIC first maps, to the smaller second gray level, the first gray level of the first image sent by the AP, and then adjusts (compensates) the brightness of the image in the first display area of the first image with the second gray level. Even if the original first gray level of the first image is high, the brightness may be adjusted, to avoid a case in which only brightness of the image in another display area can be reduced, resulting in a large sacrifice of overall brightness of the screen. In this way, both the display area of which brightness is adjusted and a manner of adjusting the brightness can be flexibly adjusted, and an aging compensation effect is better, and uneven aging of the display is effectively alleviated, for example, a display effect is more even and use efficiency is higher.

In a possible implementation, the AP is further configured to send second compensation data to the DDIC; the DDIC is further configured to adjust brightness of a third image in a second display area of the first image based on the second compensation data and the second gray level; and the display panel is further configured to display, in the second display area, a third image of which brightness is adjusted.

In this application, there may be a plurality of display areas of which brightness is adjusted. The AP may separately send different compensation data for different display areas, and the DDIC adjusts brightness of an image in a corresponding display area based on the compensation data. An adjustment manner is flexible and variable, and the aging compensation effect is better. For example, display effects are consistent when the plurality of display areas are used for display together.

In a possible implementation, displaying, in the first display area, the second image of which brightness is adjusted includes: sequentially refreshing and displaying, from a 1$^{st}$ row to a last row of the first display area, the second image of which brightness is adjusted; the AP is further configured to send the second compensation data to the DDIC; the DDIC is further configured to: after the display panel refreshes and displays, in the 1$^{st}$ row of the first display area, the second image of which brightness is adjusted, adjust the brightness of the third image in the second display area of the first image based on the second compensation data and the second gray level; and the display panel is further configured to display, in the second display area, a third image of which brightness is adjusted.

In this application, after controlling the image to be displayed in the 1$^{st}$ row of the first display area, and before controlling the image to be displayed in a 1$^{st}$ row of the second display area, the DDIC adjusts the brightness of the third image in the second display area, instead of adjusting the images in the first display area and the second display area before controlling the image to be displayed in the 1$^{st}$ row of the first display area. This can avoid a case in which an amount of the data is large during brightness adjustment, and compensation data of a plurality of display areas simultaneously takes effect in a frame header (for example, the 1$^{st}$ row of the first display area) of a next frame, resulting in a processing exception caused by excessively high processing pressure of the DDIC.

In a possible implementation, the brightness of the second image with the first gray level is less than the brightness of the third image with the first gray level, a gray level of the second image of which brightness is adjusted is greater than the second gray level, and a gray level of the third image of which brightness is adjusted is less than the second gray level.

In this application, for the second image in the first display area with low brightness with a same gray level, the gray level may be increased, and for the third image in the second display area with high brightness with a same gray level, the gray level may be decreased. The adjustment manner is flexible and variable, and the aging compensation effect is better. For example, display effects of the first display area and the second display area are consistent.

In a possible implementation, adjusting the brightness of the second image in the first display area of the first image based on the first compensation data and the second gray level includes: setting a gray level of the second image in the first display area to a third gray level, where the third gray level is determined based on the second gray level and the first compensation data.

In a possible implementation, the AP is further configured to send first indication information to the DDIC, where the first indication information indicates a location of the first display area.

In this application, the AP may indicate a location of any display area to the DDIC, the display area of which brightness is adjusted may be defined based on an actual situation, and an application scenario is wider.

In a possible implementation, the AP is further configured to send second indication information when sending the first compensation data to the DDIC, where information indicating the first display area in the second indication information corresponds to the first compensation data.

In a possible implementation, the AP is further configured to: when the display panel displays an image, obtain statistical information of the first display area, and determine the first compensation data based on the statistical information of the first display area, where the statistical information includes at least one of the following: display duration, display brightness, and a temperature.

In this application, the first compensation data determined by the AP is obtained based on the statistical information when the first display area actually displays the image, and is more authentic and effective. The brightness of the image in the first display area is adjusted based on the compensation data, and the aging compensation effect is also better.

In a possible implementation, mapping the first gray level of the first image to the second gray level includes: mapping the first gray level of the first image to the second gray level based on a first mapping relationship, where the first mapping relationship is a mapping relationship preset by the DDIC, or the first mapping relationship is received by the DDIC from the AP.

In this application, the AP may indicate a gray level mapping relationship to the DDIC, and the AP may adjust the mapping relationship based on an actual situation, to achieve a better compensation effect, and the application scenario is wider.

According to a second aspect, an embodiment of this application provides a communication apparatus, including a processor, a memory, and a communication interface. The processor is configured to determine a first image and first compensation data; and the communication interface is configured to send the first image and the first compensation data to a display driver chip DDIC of a display, where the first image is used by the DDIC to map a first gray level of the first image to a second gray level, the second gray level is less than the first gray level, and the first compensation data is used by the DDIC to adjust, based on the second gray level, brightness of a second image in a first display area of the first image.

According to a third aspect, an embodiment of this application provides another communication apparatus, including a processor, a memory, and a communication interface. The communication interface is configured to receive a first image and first compensation data; the processor is configured to map a first gray level of the first image to a second gray level, where the second gray level is less than the first gray level; the processor is configured to adjust brightness of a second image in a first display area of the first image based on the first compensation data and the second gray level; and the processor is configured to control a display panel to display, in the first display area, a second image of which brightness is adjusted.

According to a fourth aspect, an embodiment of this application provides a partition compensation method, applied to an electronic device, where the electronic device includes an application processor AP and a display, the display includes a display driver chip DDIC and a display panel, and the method includes: The AP sends a first image and first compensation data to the DDIC; the DDIC maps a first gray level of the first image to a second gray level, where the second gray level is less than the first gray level; the DDIC adjusts brightness of a second image in a first display area of the first image based on the first compensation data and the second gray level; and the display panel displays, in the first display area, a second image of which brightness is adjusted.

According to a fifth aspect, an embodiment of this application provides a computer storage medium. The computer storage medium stores a computer program, and when the computer program is executed by a processor, the partition compensation method provided in any one of the fourth aspect of this embodiment of this application and the implementations of the fourth aspect is implemented.

According to a sixth aspect, an embodiment of this application provides a computer program product. When the computer program product runs on a communication apparatus, the communication apparatus is enabled to perform the partition compensation method provided in any one of the fourth aspect of this embodiment of this application and the implementations of the fourth aspect.

According to a seventh aspect, an embodiment of this application provides an electronic device. The electronic device includes the method or apparatus for performing any embodiment of this application. For example, the electronic device is a chip.

It should be understood that descriptions of technical features, technical solutions, advantageous effects, or similar words in this application do not imply that all features and advantages can be implemented in any individual embodiment. On the contrary, it may be understood that the descriptions of the features or the advantageous effects mean that at least one embodiment includes a specific technical feature, technical solution, or advantageous effect. Therefore, the descriptions of the technical features, the technical solutions, or the advantageous effects in this specification may not necessarily be specific to a same embodiment. Further, the technical features, the technical solutions, and the advantageous effects described in embodiments may be combined in any proper manner. A person skilled in the art understands that an embodiment may be implemented without one or more specific technical features, technical solutions, or advantageous effects in a specific embodiment. In other embodiments, additional technical features and advantageous effects may be further identified in a specific embodiment that does not reflect all embodiments.

DESCRIPTION OF EMBODIMENTS

The terms used in the description of the present invention in this specification are merely for the purpose of describing specific embodiments, and are not intended to limit the present invention. Terms "one", "a", "the", "this", and "the one" of singular forms used in this specification and the appended claims of the present invention are also intended to include plural forms, unless the opposite is explicitly indicated in the context thereof. It should also be understood that, the term "and/or" used herein indicates and includes any or all possible combinations of one or more associated listed items.

An electronic device in embodiments of this application may be a mobile terminal like a mobile phone, a tablet computer, a handheld computer, or a personal digital assistant (Personal Digital Assistant, PDA), a smart home device like a smart television or a smart camera, a wearable device like a smart band, a smart watch, or smart glasses, or another electronic device like a desktop, a laptop, a notebook computer, an ultra-mobile personal computer (Ultra-mobile Personal Computer, UMPC), a netbook, or a smart screen.

Figure 1:
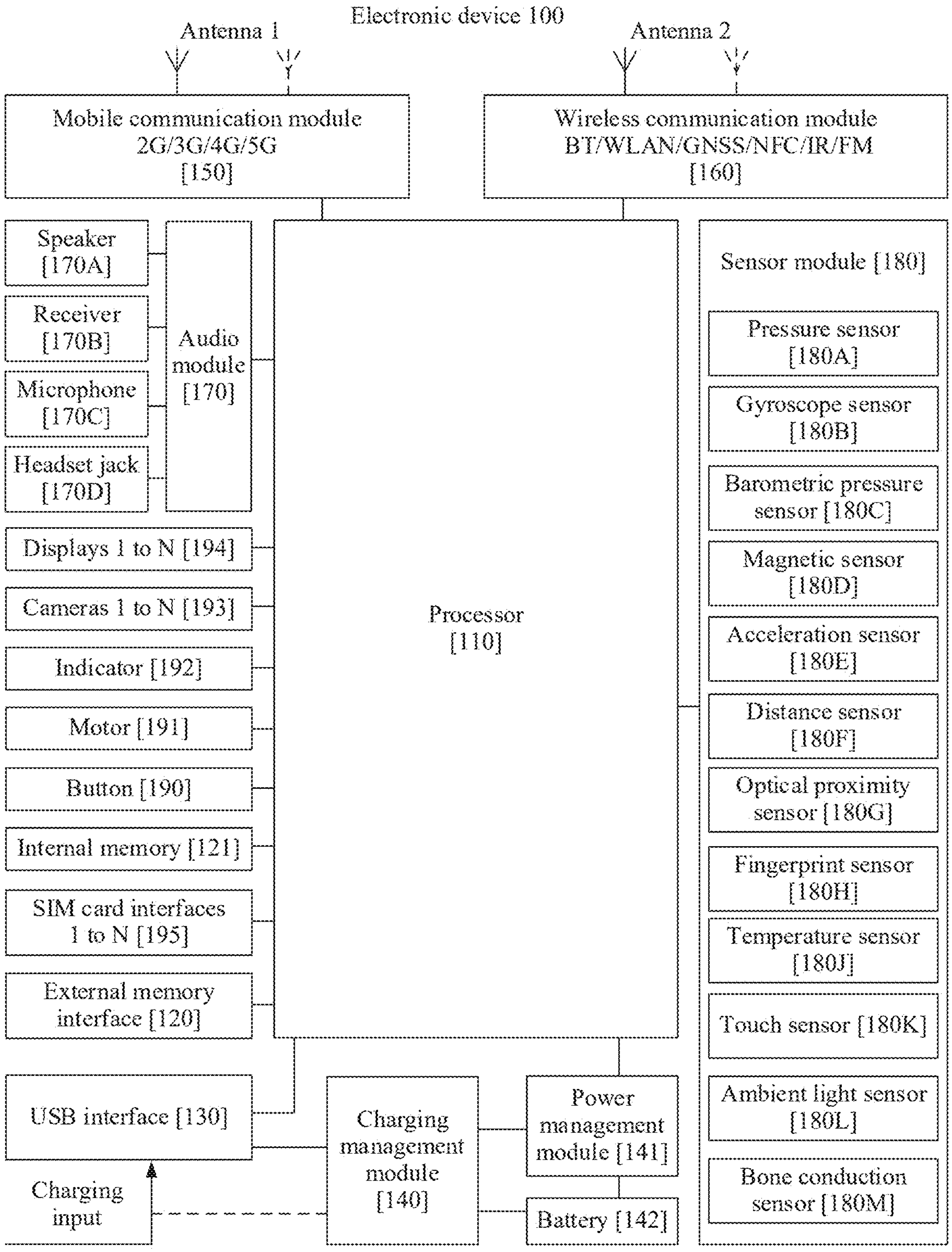
FIG. 1 is a schematic diagram of a structure of an electronic device according to an embodiment of this application.

The following describes an example of an electronic device 100 according to an embodiment of this application. FIG. 1 is an example of a schematic diagram of a structure of an electronic device 100.

As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or a combination of a part of the components, or splits from a part of the components, or an arrangement of different components. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. For example, the plurality of processing units shown above are all integrated into one system on chip (system on chip, SoC), or the AP is an independent semiconductor chip, and other processing units are integrated into one SoC. This is not limited in this application.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store the instructions or the data that have/has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more communication interfaces (interfaces for short). The interface may include, for example, but is not limited to, an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, an MIPI, a general-purpose input/output (general-purpose input/output, GPIO) interface, a subscriber identity module (subscriber identity module, SIM) interface, and/or a universal serial bus (universal serial bus, USB) interface.

The MIPI interface may be configured to connect the processor 110 to a peripheral component like the camera 193 or the display 194. In some embodiments, the MIPI interface may include a display serial interface (display serial interface, DSI), a camera serial interface (camera serial interface, CSI), and the like. Optionally, the processor 110 communicates with the camera 193 through the CSI interface, to implement a photographing function of the electronic device 100. Optionally, the processor 110 communicates with the display 194 through the DSI interface, to implement a display function of the electronic device 100.

It may be understood that an interface connection relationship between the modules that is shown in embodiments of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the antenna 2, the mobile communication module 150, the wireless communication module 160, the modem processor, the baseband processor, and the like.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology.

The electronic device 100 may implement a display function through the GPU, the display 194, the application processor, and the like. In some embodiments, the GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. In some embodiments, the display 194 may include a display driver integrated circuit (display driver integrated circuit, DDIC) and a display panel. The DDIC is an apparatus (for example, a chip) that is inside the display 194 and that is configured to control the display 194 to work. For example, the DDIC may generate a specific electrical signal to control the display panel to display an image. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, quantum dot light emitting diode (quantum dot light-emitting diode, QLED), or the like. In some embodiments, the electronic device 100 may include one or more displays 194. In some embodiments, one display 194 may include one or more DDICs.

The electronic device 100 may implement a photographing function through the ISP, the camera 193, the video codec, the GPU, the display 194, the application processor, and the like.

The electronic device 100 may implement an audio function, for example, music playing and recording, through the audio module 170, the speaker 170A, the receiver 170B, the microphone 170C, the headset jack 170D, the application processor, and the like.

With use of the display of the electronic device, a material of the display attenuates, for example, a self-luminous organic material like the OLED or the AMOLED, and a problem like aging or screen burn-in occurs. In particular, different display areas may have different use time, resulting in uneven aging of the different display areas of the display. For example, in a smart cover mode, a display area that is of the display and that is not covered by a smart cover has longer use time and a higher aging degree. Alternatively, a primary screen of a foldable display has longer use time than a secondary screen, and therefore an aging degree of the primary screen is higher than that of the secondary screen, and aging is more serious.

Figure 2A:
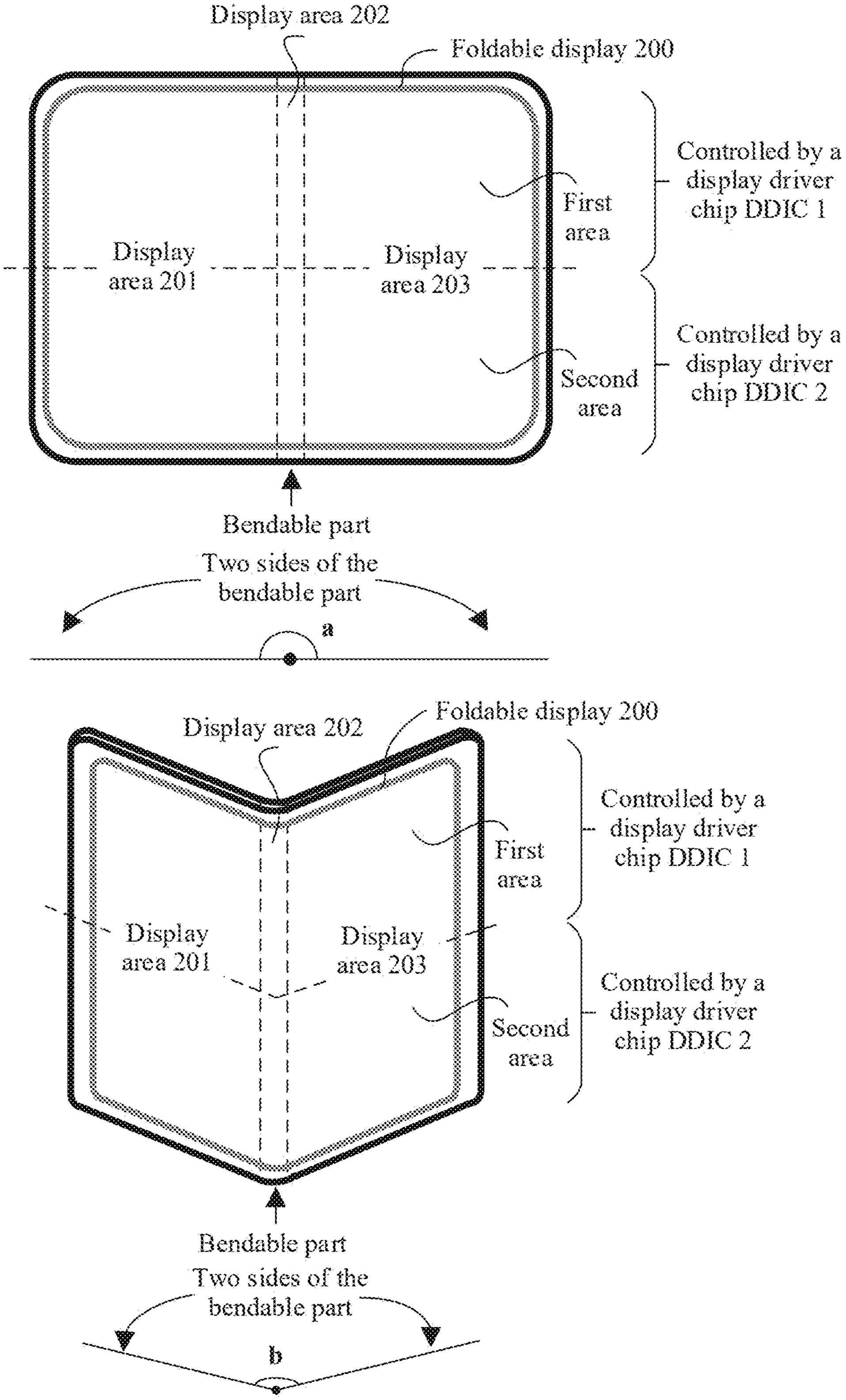
FIG. 2A to FIG. 2C are schematic diagrams of some forms of an electronic device according to an embodiment of this application.
Figure 2B:
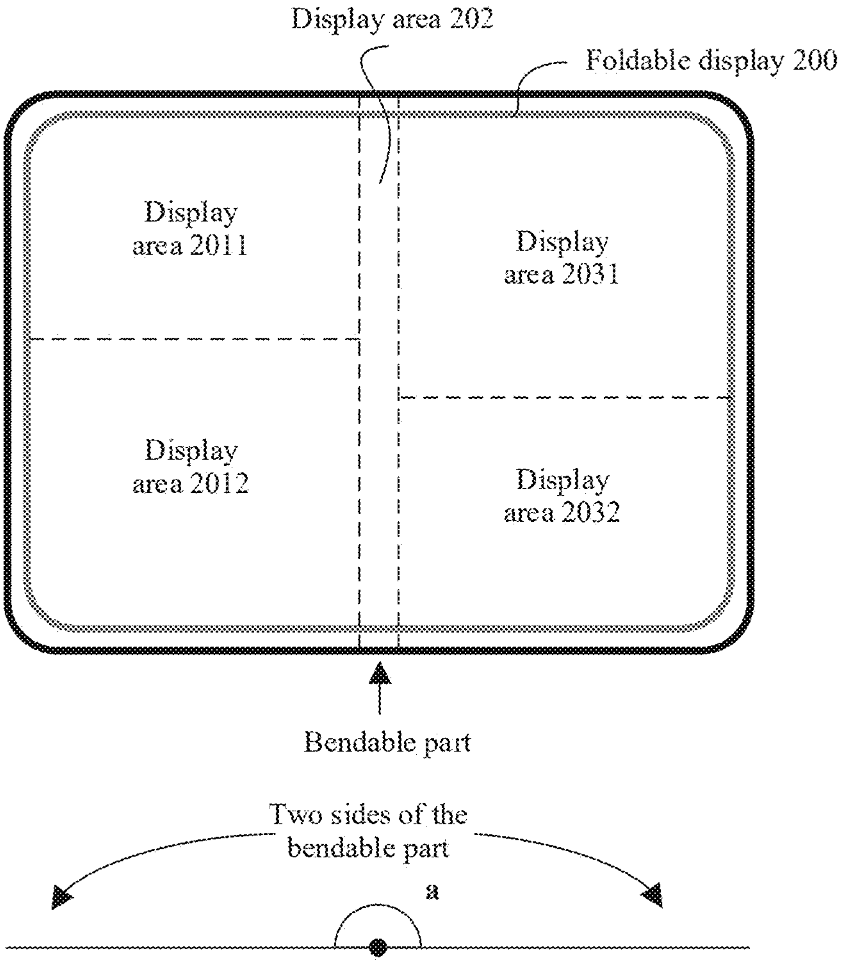
Figure 2C:
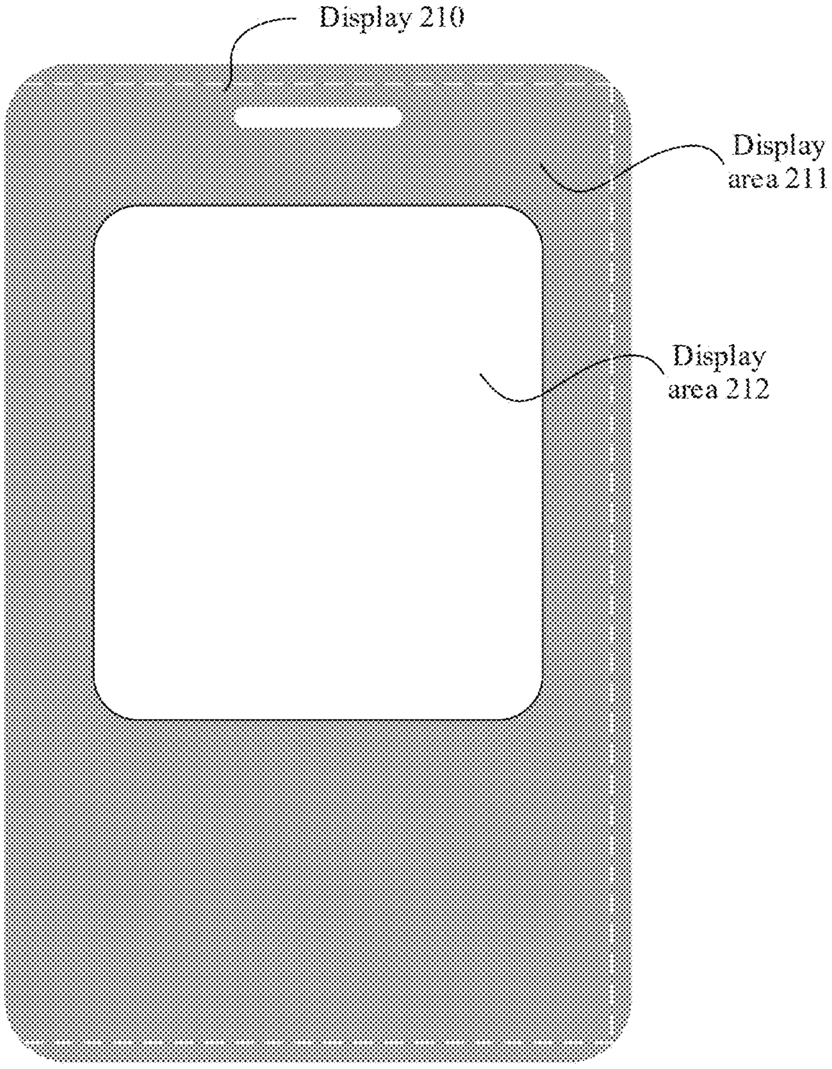

It may be understood that the different display areas (which may also be referred to as a plurality of display areas in the following) may be different displays. For example, a first display area and a second display area are two different displays, to form a foldable or expandable display through a connection component like a chain. Specific examples are shown in FIG. 2A and FIG. 2B. The different display areas may also be different display areas of a same display. For example, the first display area and the second display area are two different areas of an unfoldable display. A specific example is shown in FIG. 2C. This is not limited in this application.

If the display is not compensated (for example, performed brightness adjustment), the aging is more serious, and problems such as uneven light emitting, low use efficiency, a yellowish display color, high power consumption, and a short service life occur. In addition, aging is more uneven, and product availability is not high. Pixels on the display may be arranged in a red green blue (red green blue, RGB) color mode. For example, one pixel may include three sub-pixels: red (red, R), green (green, G), and blue (blue, B). With use of a screen, pixels on the screen attenuate, but pixels of different colors attenuate to different degrees, where a blue pixel is attenuated at a highest speed, resulting in a problem that a display color of an aging display area is yellowish. When a pixel of the aging display area attenuates, light emitting is uneven, and actual display brightness is lower than theoretical display brightness. To ensure that the actual display brightness is consistent with the theoretical display brightness, the electronic device usually needs to increase a drive voltage, resulting in high power consumption.

Figure 3A:
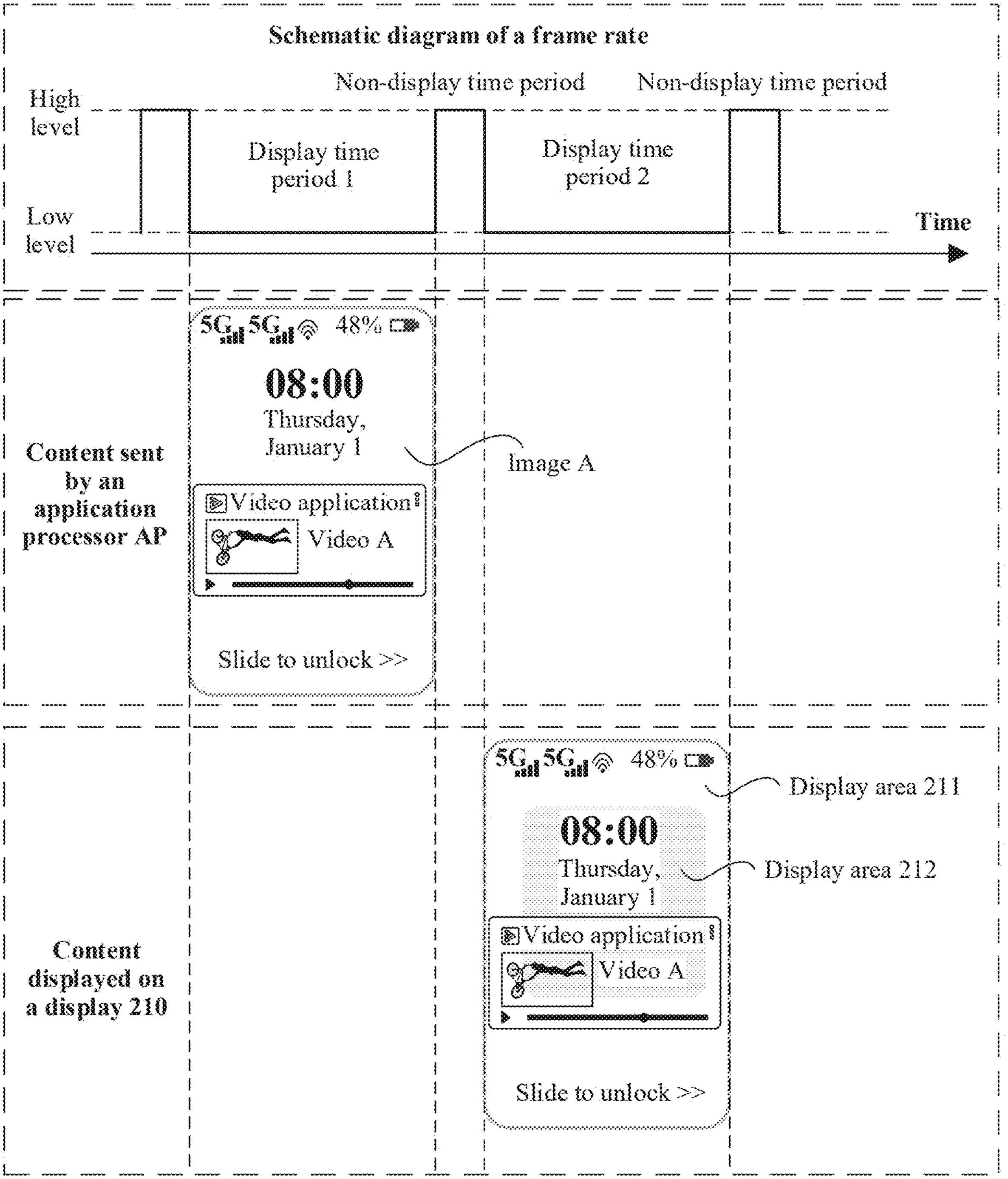
FIG. 3A and FIG. 3B are schematic diagrams of some display processes according to an embodiment of this application.

In addition, if the display is not compensated (for example, performed brightness adjustment), when display areas with different aging degrees are used for display together, display effects of different display areas are different (for example, brightness and colors are different, and a specific example is shown in FIG. 3A below), which greatly affects user experience.

FIG. 2A is an example of a schematic diagram of a form of an electronic device. The upper part in FIG. 2A is a schematic diagram of a field of view of an electronic device, and the lower part in FIG. 2A is a schematic diagram of another field of view of the electronic device.

As shown in FIG. 2A, the electronic device may be configured with a display 200. The display 200 may be a flexible foldable or expandable display, and may be referred to as a foldable display 200 in the following. In some embodiments, the foldable display 200 may include a display area 201, a display area 202, and a display area 203. The display area 202 is a part that can be bent (bendable part for short). The foldable display 200 may be bent along the bendable part, and the display area 201 and the display area 203 are respectively located on two sides of the bendable part. The foldable display 200 may be in an expanded state or a folded state, or it may be understood as that an electronic device configured with the foldable display 200 may be in an expanded state or a folded state.

As shown in the upper part in FIG. 2A, when the foldable display 200 is in the expanded state, a bent angle a of the foldable display 200 is approximately 180 degrees. It may alternatively be understood that an included angle a between planes on which the display area 201 and the display area 203 on the two sides of the bendable part are respectively located is approximately 180 degrees. This is not limited thereto. Alternatively, a may be greater than or equal to 170 degrees and less than or equal to 180 degrees. A specific value of the bent angle of the foldable display in the expanded state is not limited in this application.

As shown in the lower part in FIG. 2A, when the foldable display 200 is in the folded state, a bent angle b of the foldable display 200 is approximately 60 degrees. It may alternatively be understood that an included angle b between planes on which the display area 201 and the display area 203 on two sides of the bendable part are respectively located is approximately 120 degrees (180 degrees minus 60 degrees is 120 degrees). This is not limited thereto. Alternatively, b may be greater than or equal to 0 degrees and less than 180 degrees, for example, but is not limited to 0 degrees (in this case, a light-emitting surface of the display area 201 is opposite to a light-emitting surface of the display area 203), 30 degrees, or 90 degrees. A specific value of the bent angle of the foldable display in the bent state is not limited in this application.

In some embodiments, as shown in FIG. 2A, the foldable display 200 may be divided into two areas along a central axis: a first area and a second area, and the central axis is perpendicular to an axis on which the bendable part is located. The first area may be controlled by a DDIC 1 of the foldable display 200 to display, and the second area may be controlled by a DDIC 2 of the foldable display 200 to display. In some embodiments, the DDIC 1 and the DDIC 2 may be connected in a series manner. Optionally, the DDIC 1 and the DDIC 2 may be respectively a primary DDIC and a secondary DDIC. The primary DDIC may be configured to control the secondary DDIC to work, so that the first area and the second area jointly display a frame of image. In some other embodiments, the foldable display 200 may alternatively be divided into two areas along a central axis on which the bendable part is located, and the two areas are controlled by different DDICs included in the foldable display 200. Alternatively, the foldable display 200 may alternatively include more DDICs for controlling display. This is not limited in this application.

This is not limited to the case in FIG. 2A. In some other embodiments, the foldable display 200 may alternatively be a display formed by splicing an unfoldable display (which may be referred to as a rigid display), a flexible foldable or expandable display (which may be referred to as a flexible display) and a connection component like a chain. For example, the foldable display 200 may be formed by splicing two rigid displays and one flexible display. The display area 201 and the display area 203 are areas on the two rigid displays respectively, and the display area 202 is an area on the flexible display. The display areas are all used to display a user interface.

This is not limited to the case in FIG. 2A. In some other embodiments, the foldable display 200 may further include more display areas. For example, the display area 201 shown in FIG. 2A may further include a display area 2011 and a display area 2012, and the display area 203 may further include a display area 2031 and a display area 2032. A specific example is shown in FIG. 2B. The foldable display 200 shown in FIG. 2B is similar to the foldable display 200 shown in FIG. 2A. For details, refer to the descriptions of FIG. 2A.

It may be understood that, in the foldable display 200 shown in FIG. 2A and FIG. 2B, different display areas may have different use time, resulting in different aging degrees. For example, use time of the display area 201 is longer than use time of the display area 202 and the display area 203. If the display area 201 and the display area 202 and/or the display area 203 are jointly used to display an image, problems such as a poor display effect like lower display brightness or a yellower display color in the display area 201, low use efficiency, and high use power consumption may occur.

In some other embodiments, the electronic device may further wear a smart cover and enable a smart cover mode. A specific example is shown in FIG. 2C.

FIG. 2C is an example of a schematic diagram of another form of an electronic device.

As shown in FIG. 2C, when the electronic device wears a smart cover, a display area 211 of a display 210 of the electronic device is covered by the smart cover, and therefore does not display an image. A display area 212 is not covered by the smart cover, and therefore may be used to display an image. When the smart cover is lifted, neither the display area 211 nor the display area 212 in the display 210 is covered by the smart cover, and therefore both them may be used to display an image. Therefore, use time of the display area 212 is longer than use time of the display area 211. When the display area 211 and the display area 212 are jointly used to display an image, problems such as lower display brightness and a yellower display color in the display area 212, low use efficiency, and high use power consumption may occur. A specific example is shown in FIG. 3A. In some embodiments, the display 210 may be controlled, by using at least one DDIC, to display. For example, an upper half part may be controlled, by using a DDIC 1, to display, and a lower half part may be controlled, by using a DDIC 2, to display.

A form of the electronic device is not limited to the examples. In some other embodiments, displays may be configured on both sides of the electronic device. One of the displays may be an unfoldable display, or may be a flexible foldable or expandable display. In some other embodiments, a flexible foldable or expandable display may be configured for the electronic device, and the display covers two sides of the electronic device. A specific form of the display is not limited in this application.

FIG. 3A is an example of a schematic diagram of a display process. In FIG. 3A, an example in which the display of the electronic device is the display 210 shown in FIG. 2C is used for description.

As shown in FIG. 3A, in a schematic diagram of a frame rate, a horizontal axis is time, and a vertical axis is a level value, where a high level represents a non-display state, a low level represents a display state, and a high level and a low level appear alternately. Therefore, the time shown by the horizontal axis may include a plurality of display time periods (a period in which a level value is a low level) and a non-display time period (a period in which a level value is a high level). The display time period periodically appears. One display time period may be understood as a time period in which the display displays a current frame of image, and one non-display time period may be understood as a time period in which the display does not display or displays a previous frame of image. For example, if the frame rate is 90 Hz, a display time period is 1/90 second, namely, 11.1 milliseconds (ms). When the frame rate is 120 Hz, a display time period is 1/120 second, namely, 8.3 ms.

As shown in FIG. 3A, an AP sends an image A to the display 210 in a display time period 1, and the display 210 may display the image A in a next display time period 2. Although theoretical brightness values of the display area 211 and the display area 212 are the same, because use time of the display area 212 is longer, when the display 210 displays the image A, actual display brightness of the display area 212 is lower than actual display brightness of the display area 211. When watching the display 210, a user may feel that the display area 212 is darker than the display area 211, resulting in poor experience.

In some embodiments, the AP may send the image A and a plurality of pieces of compensation data to the display 210. The plurality of pieces of compensation data are respectively used to adjust brightness of images in a plurality of display areas of the image A, which may also be referred to as being respectively used to compensate the images in the plurality of display areas of the image A. The display 210 may separately adjust, based on the plurality of pieces of compensation data, brightness of images in a plurality of display areas of a to-be-displayed image, which may be referred to as compensating the display areas for short subsequently. In this way, it can be ensured that display effects of the plurality of display areas are consistent. A specific example is shown in FIG. 3B.

Figure 3B:
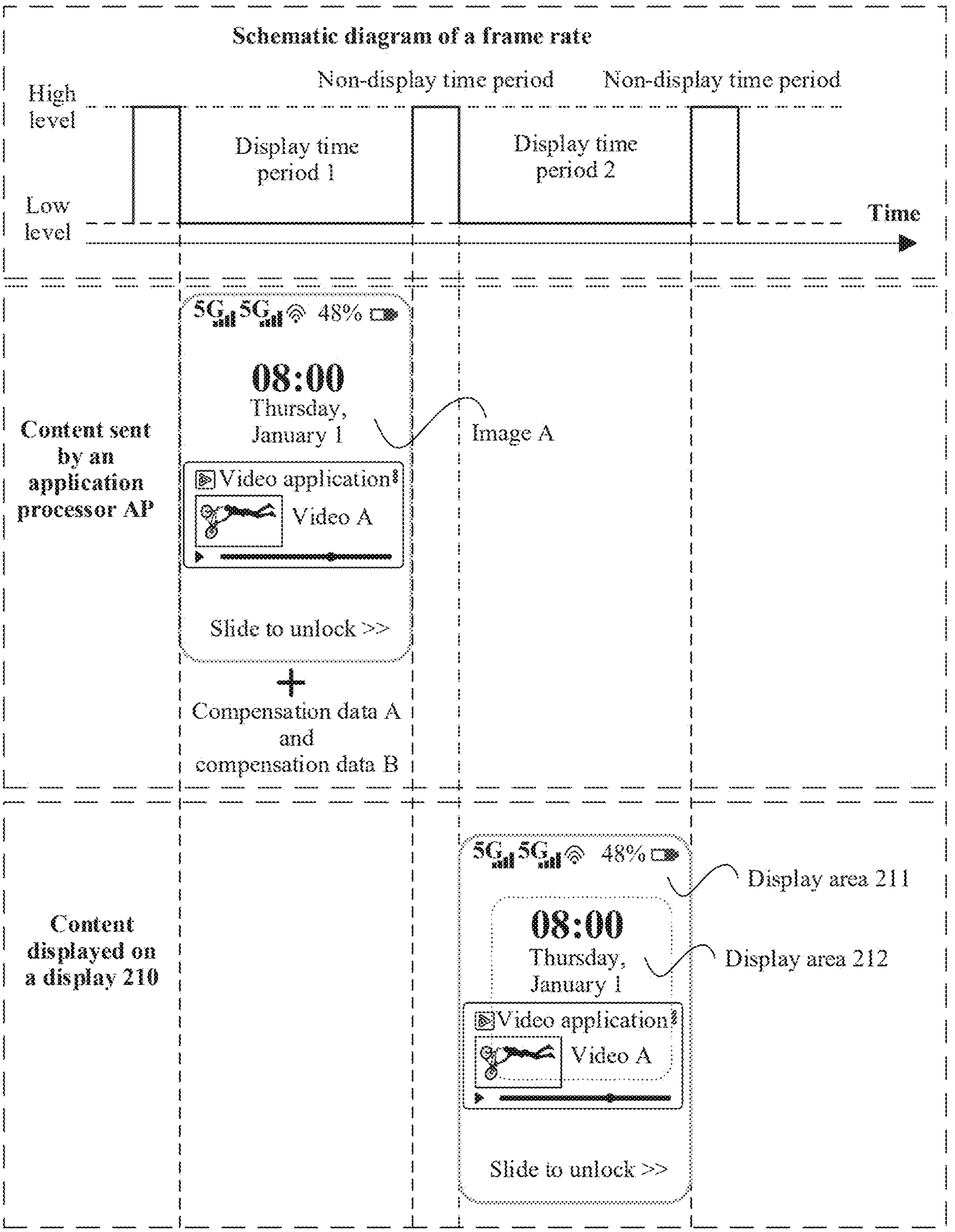

FIG. 3B is an example of a schematic diagram of another display process. In FIG. 3B, an example in which the display of the electronic device is the display 210 shown in FIG. 2C is used for description. A schematic diagram of a frame rate shown in FIG. 3B is consistent with that shown in FIG. 3A, and details are not described again.

As shown in FIG. 3B, an AP sends, to the display 210 in a display time period 1, an image A, compensation data 1 corresponding to the display area 211, and compensation data 2 corresponding to the display area 212. The display 210 may compensate the display area 211 based on the compensation data 1, compensate the display area 212 based on the compensation data 2, and display a compensated image A in a next display time period 2. When the display 210 displays the compensated image A, display brightness of the display area 211 and the display area 212 with different aging degrees is consistent, so that user experience is good.

It may be understood that, compared with a solution in which the AP performs aging compensation for an image and sends a compensated image to the display for display, a solution in which the display performs partition aging compensation does not depend on a platform and a vendor of the AP. Even if aging compensation capabilities of APs used in different application scenarios are different (for example, some APs do not support aging compensation and can only calculate compensation data, or some APs have a poor aging compensation effect), normal aging compensation can be ensured, and display effects of different display areas of the display are also consistent, so that user experience is better. In addition, duration of a display time period is usually required for the AP to perform aging compensation. For example, the AP performs aging compensation in the display time period 1 to obtain the compensated image, and sends the compensated image to the display in the display time period 2, and the display displays the compensated image only in a display time period 3. This increases display duration and is not efficient.

Figure 4A:
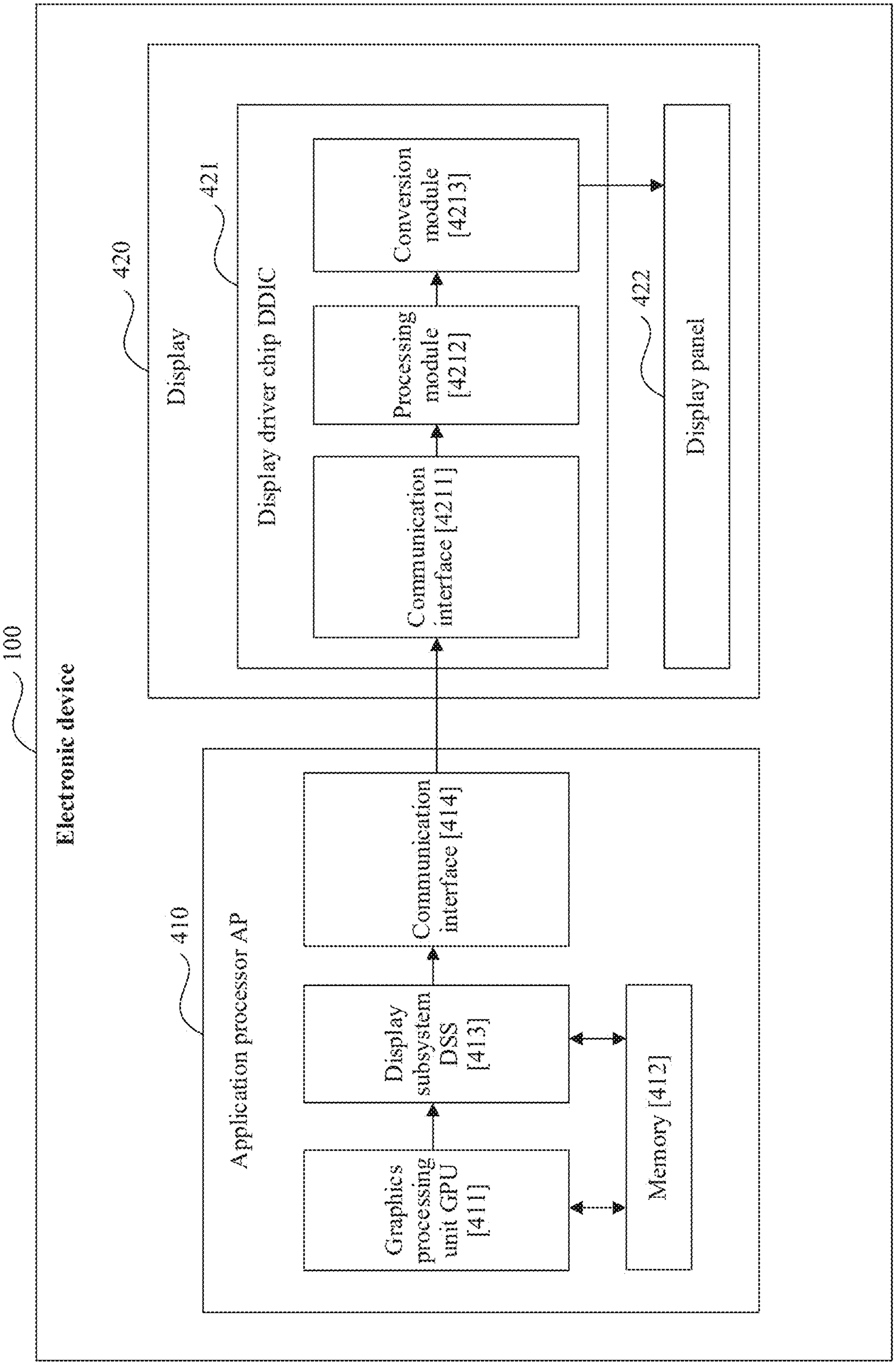
FIG. 4A and FIG. 4B are schematic diagrams of some other structures of an electronic device according to an embodiment of this application.

FIG. 4A is an example of a schematic diagram of a structure of an electronic device 100 in some other embodiments.

As shown in FIG. 4A, the electronic device 100 may include an AP 410 and a display 420. The AP 410 may include a GPU 411, a memory 412, a display subsystem (display subsystem, DSS) 413, and a communication interface 414. The display 420 may include a DDIC 421 and a display panel 422, and the DDIC 421 may include a communication interface 4211, a processing module 4212, and a conversion module 4213. In some embodiments, the AP 410 is the AP included in the processor 110 shown in FIG. 1, and the display 420 is the display 194 shown in FIG. 1. For the DDIC 421 and the display panel 422, refer to the descriptions of the DDIC and the display panel included in the display 194.

The GPU 411 included in the AP 410 may be configured to perform drawing and rendering computation on image data, to generate a first image. The GPU 411 may also be referred to as a display core or a visual processor, is a microprocessor that performs image computation, and may have a 2D (dimension, Dimension) and/or 3D processing function. In some embodiments, after generating the first image, the GPU 411 may send the first image to the memory 412 for storage. In some other embodiments, after generating the first image, the GPU 411 may directly send the first image to the DSS 413 for processing. The memory 412 may be configured to store instructions and data. The memory 412 is, for example, a double data rate (double data rate, DDR) synchronous dynamic random access memory. The DSS 413 may be configured to: connect to the display 420, and process the first image generated by the CPU or the GPU 411. Different from pixel-level processing performed by the GPU on a specific displayed image, the DSS 413 performs desktop-level display processing such as image scaling (size change), direction flipping, brightness and contrast adjustment, superposition of a plurality of layers/windows, and aging compensation of the display. In some embodiments, the DSS 413 may process the first image sent by the GPU 411. In some other embodiments, the DSS 413 may process an image obtained from the memory 412. In some embodiments, an image processed by the DSS 413 may be sent through the communication interface 414. The communication interface 414 may be configured to send data and/or an instruction to the DDIC 421. The communication interface 414 is, for example, but is not limited to, an MIPI interface or a high-definition multimedia interface (HDMI).

The communication interface 4211 included in the DDIC 421 may be configured to receive the data and/or the instruction sent by the AP 410. The communication interface 4211 is, for example, but is not limited to, an MIPI interface or an HDMI interface. In some embodiments, the data is transmitted between the communication interface 414 and the communication interface 4211. In this case, the communication interface 414 and the communication interface 4211 are of a same type, for example, both are MIPI interfaces. The processing module 4212 may be configured to process the data and/or the instruction received through the communication interface 4211, for example, separately perform compensation (which may be referred to as partition aging compensation for short) on different display areas of the display. The conversion module 4213 may be configured to process a second image obtained by the processing module 4212, to convert the second image into a signal for controlling the display panel 422 to display. The signal may be transmitted to the display panel 422, to enable the display panel 422 to display the second image. The conversion module 4213 is, for example, a digital-to-analog converter (digital-to-analog converter, DAC).

In a possible implementation, the DSS 413 of the AP 410 may include an aging data statistics (aging data collection) module 413A and an aging compensation (aging compensation) module 413B. The processing module 4212 of the DDIC 421 may include a data remapping (data remapping) module 4212A and a pixel aging compensation (pixel aging compensation) module 4212B. For a specific example, refer to FIG. 4B.

Figure 4B:
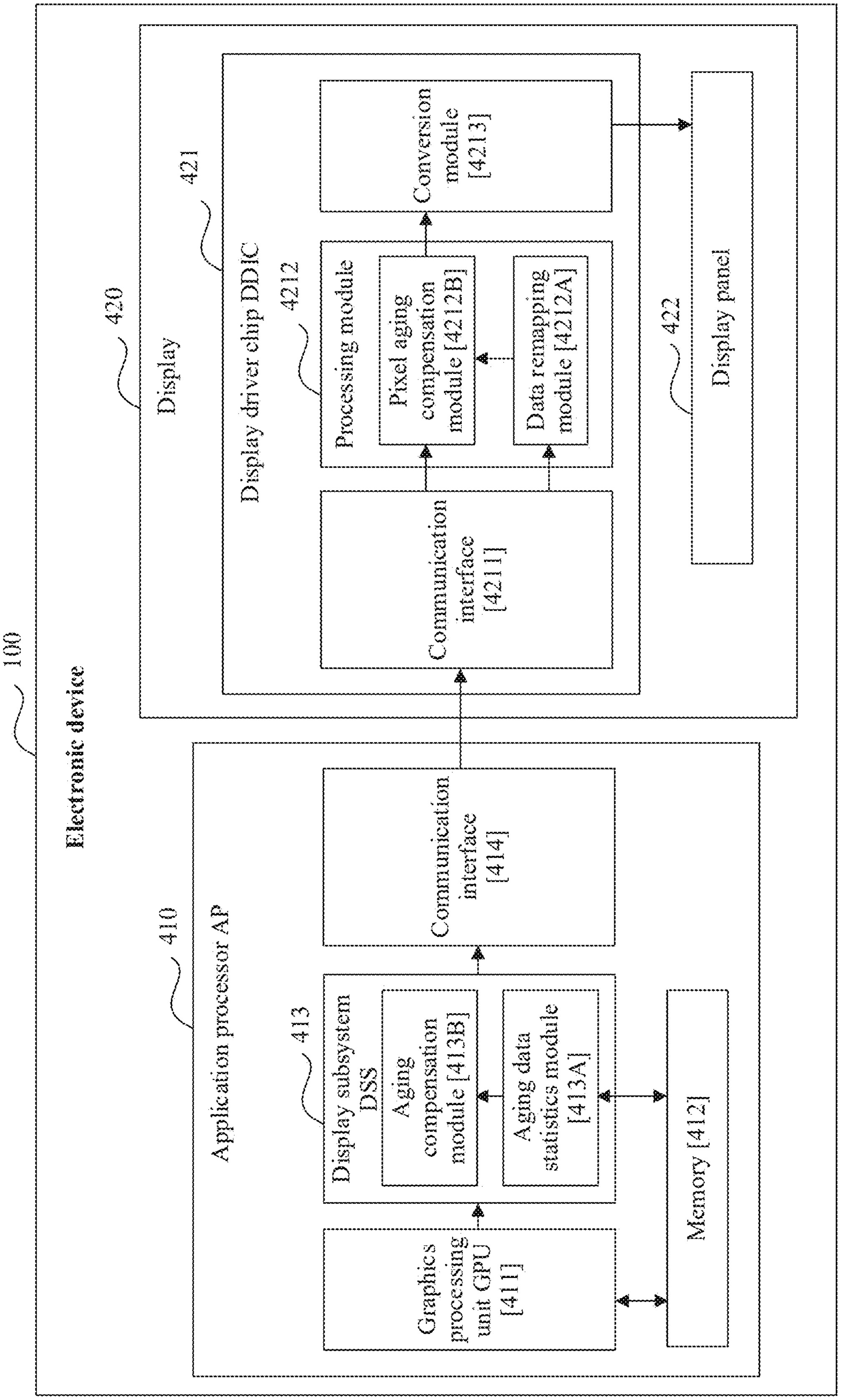

As shown in FIG. 4B, when the display panel 422 displays an image, the aging data statistics module 413A in the AP 410 can obtain information about different pixels in a plurality of different display areas (statistical information for short) in real time, for example, separately obtain statistical information of an R pixel, a G pixel, and a B pixel. The statistical information includes, for example, but is not limited to, lighting duration (duration for display), display brightness, and a temperature. In some embodiments, the aging data statistics module 413A may send, at an interval of the first time period, statistical information obtained in a previous first time period to the memory 412 for storage. In some embodiments, the aging data statistics module 413A may send, at an interval of the first time period, statistical information obtained in a previous first time period to the aging compensation module 413B for processing. The aging compensation module 413B may process statistical information obtained in a second time period, to obtain compensation data respectively corresponding to a plurality of different display areas of the display panel 422, where the second time period may include at least one first time period. The image generated by the GPU 411 or the image processed by the DSS 413, and a plurality of pieces of compensation data determined by the aging compensation module 413B may be sent to the DDIC 421 through the communication interface 414, and received through the communication interface 4211 of the DDIC 421.

As shown in FIG. 4B, a third image sent by the AP 410 may be sent to the data remapping module 4212A in the DDIC 421 for processing. The data remapping module 4212A may be configured to map, to a second gray level, a first gray level of the third image sent by the AP 410, where the second gray level is less than the first gray level. A processing manner of the data remapping module 4212A may also be referred to as gray level scale-down. In some embodiments, the data remapping module 4212A maps, to a drive voltage corresponding to the second gray level, a drive voltage corresponding to the first gray level. For example, a value range of the first gray level is [0, 4095]. When the first gray level is the maximum value 4095, the first gray level corresponds to a preset first drive voltage (for example, 6.7 volts (volt. V). A value range of the second gray level is [0, 4000]. When the first gray level is the maximum value 4095, the mapped second gray level is the maximum value 4000. In this case, the drive voltage corresponding to the second gray level is the first drive voltage corresponding to the original first gray level. In some embodiments, the data remapping module 4212A may be in an on state by default. In some other embodiments, when sending an image, the AP 410 may send an enable signal and address information of the data remapping module 4212A together. Optionally, the enable signal may be written into the data remapping module 4212A corresponding to the address information, to turn on (or may be referred to as enable) the data remapping module 4212A. For example, when the data remapping module 4212A is in an off state, a bit (bit) may be 1. When the enable signal is written into the data remapping module 4212A, the bit may be set to 1, and the data remapping module 4212A is enabled.

The third image before gray level scale-down (namely, the third image sent by the AP 410) may be referred to as an input image of the data remapping module 4212A, and an image after gray level scale-down may be referred to as an output image of the data remapping module 4212A. The first gray level of the input image is greater than a second gray level of the output image. For a specific example, refer to FIG. 5A.

Figure 5A:
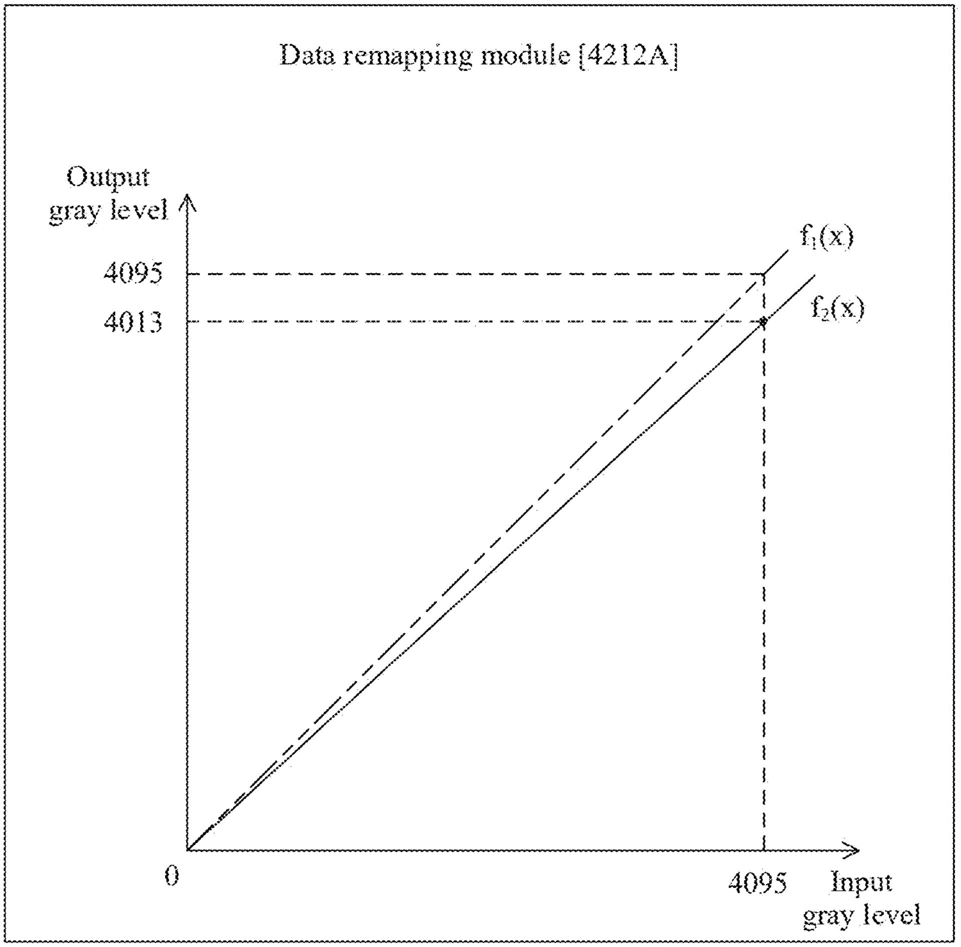
FIG. 5A is a schematic diagram of a gray level scale-down process according to an embodiment of this application.

As shown in FIG. 5A, a horizontal axis is the gray level of the input image of the data remapping module 4212A (input gray level for short), and a vertical axis is the gray level of the output image of the data remapping module 4212A (output gray level for short). It is assumed that a value range of the gray level is [0, 4095]. When processing of the data remapping module 4212A is not performed, a mapping relationship between the input gray level and the output gray level may be represented by $f_1(x)=x$, where x is the input gray level, $f_1(x)$ is the output gray level, and the output gray level is equal to the input gray level. For example, when the input gray level is 4095, the output gray level is also 4095. When processing of the data remapping module 4212A is performed, the output gray level is less than the input gray level. For example, the input gray level is 4095, and the output gray level is 4000. In this case, a mapping relationship between the input gray level and the output gray level may be represented by $f_2(x)=0.98x$, where x is the input gray level, and $f_2(x)$ is the output gray level.

This is not limited to the example in FIG. 5A. In some other embodiments, $f_2(x)=ax$, where a may be a positive number less than 1. In some other embodiments, a mapping relationship between the input gray level and the output gray level of the data remapping module 4212A may alternatively be represented by using another expression, for example, $f_2(x)=x-b$, where b may be a positive number less than x and greater than 0. The relationship between the input gray level and the output gray level of the data remapping module 4212A is not limited in this application.

Figure 5B:
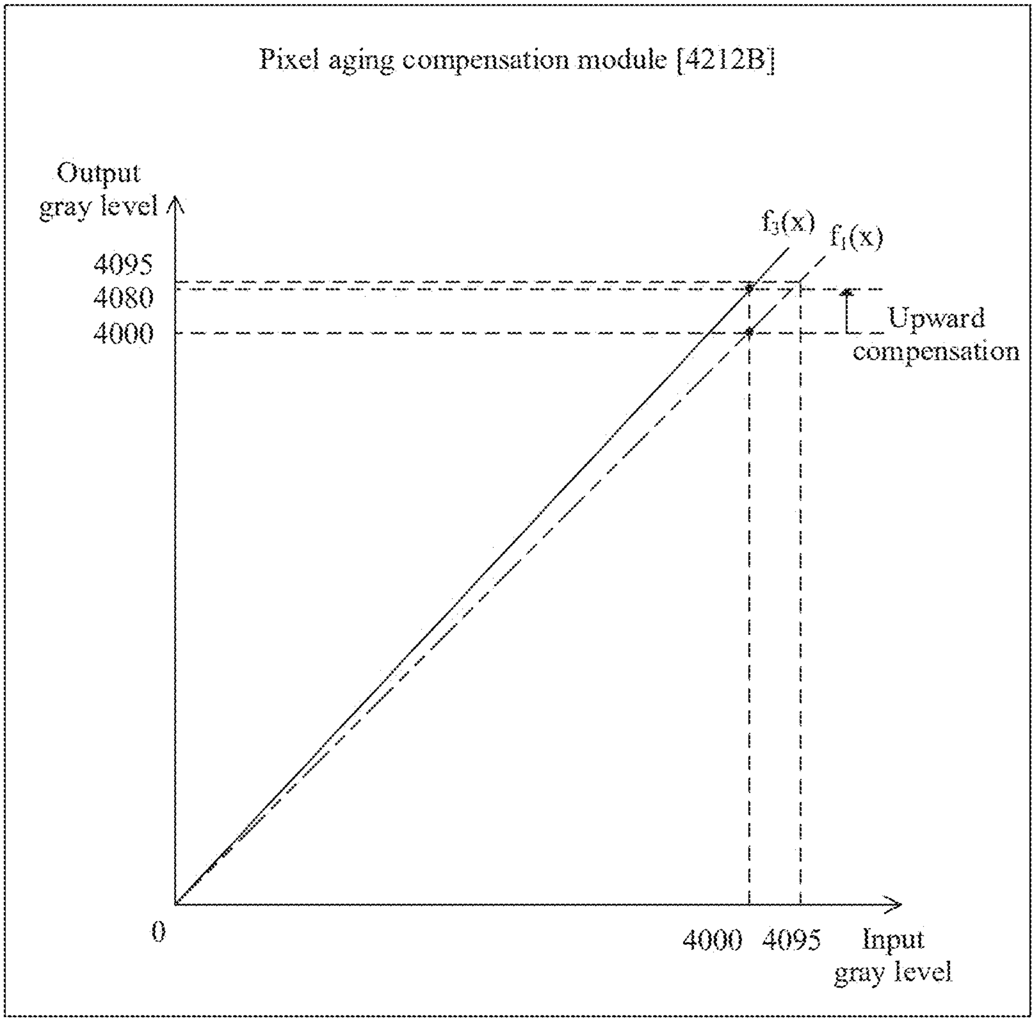
FIG. 5B and FIG. SC are schematic diagrams of some aging compensation processes according to an embodiment of this application.
Figure 5C:
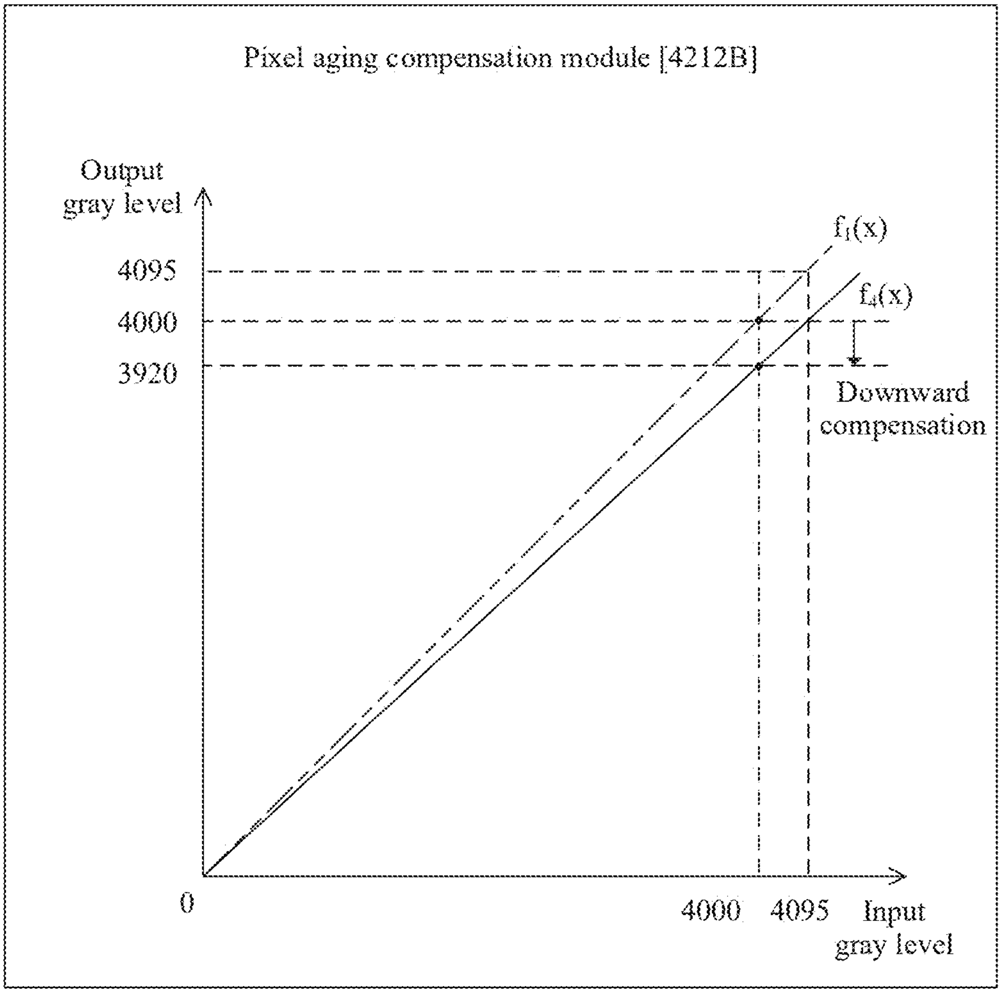

As shown in FIG. 4B, the output image of the data remapping module 4212A and compensation data sent by the AP 410 may be sent to the pixel aging compensation module 4212B for processing. In some embodiments, the pixel aging compensation module 4212B may separately compensate, based on a plurality of pieces of compensation data sent by the AP 410, display areas that are in the output image of the data remapping module 4212A and that correspond to the compensation data, which may be understood as partition aging compensation. In some embodiments, for any display area, the pixel aging compensation module 4212B may increase brightness of an image (which may be referred to as upward compensation processing) or decrease brightness of an image (which may be referred to as downward compensation processing). A gray level of an image after upward compensation is higher than a gray level of an image before upward compensation. A specific example is shown in FIG. 5B. A gray level of an image after downward compensation is lower than a gray level of an image before downward compensation. A specific example is shown in FIG. 5C.

An image before compensation of the pixel aging compensation module 4212B (namely, the output image of the data remapping module 4212A) may be referred to as an input image of the pixel aging compensation module 4212B, an image after compensation of the pixel aging compensation module 4212B may be referred to as an output image of the pixel aging compensation module 4212B, and the output image may be displayed on the display panel 422.

FIG. 5B is an example of a schematic diagram of an aging compensation process. FIG. 5B is described by using a processing manner of upward compensation as an example.

As shown in FIG. 5B, a horizontal axis is the gray level of the input image of the pixel aging compensation module 4212B (input gray level for short), and a vertical axis is the gray level of the output image of the pixel aging compensation module 4212B (output gray level for short). It is assumed that a value range of the gray level is [0, 4095]. When processing of the pixel aging compensation module 4212B is not performed, a mapping relationship between the input gray level and the output gray level may be represented by $f_1(x)=x$. For details, refer to the descriptions of $f_1(x)$ in FIG. 5A. When upward compensation processing of the pixel aging compensation module 4212B is performed, the input gray level is less than the output gray level. For example, the input gray level is 4000, and the output gray level is 4080. In this case, a mapping relationship between the input gray level and the output gray level may be represented by $f_3(x)=1.02x$, where x is the input gray level, and $f_3(x)$ is the output gray level.

In some embodiments, because a value range of the output gray level $f_3(x)$ of the pixel aging compensation module 4212B is [0, 4095], a value range of the input gray level x of the pixel aging compensation module 4212B is [0, 4015]. Therefore, the value range of the output gray level of the data remapping module 4212A is also [0, 4015]. In other words, for the input image of which gray level is greater than 4015, the data remapping module 4212A needs to scale down the gray level to 4015 or lower.

FIG. 5C is an example of a schematic diagram of another aging compensation process. FIG. 5C is described by using a processing manner of downward compensation as an example.

FIG. 5C is similar to FIG. 5B, and a difference lies in that FIG. 5C is described by using an example in which downward compensation processing of the pixel aging compensation module 4212B is performed. When downward compensation processing is performed, the input gray level is greater than the output gray level. For example, when the input gray level is 4000, the output gray level is 3920. In this case, a mapping relationship between the input gray level and the output gray level may be represented by $f_4(x)=0.98x$, where x is the input gray level, and $f_4(x)$ is the output gray level.

In some embodiments, in the examples shown in FIG. 5B and FIG. 5C, the mapping relationship between the input gray level and the output gray level may be uniformly represented as $f_5(x)=cx$, where x is the input gray level, and $f_5(x)$ is the output gray level. In upward compensation processing, c is a positive number greater than 1, and in downward compensation processing, c is a positive number less than 1. A specific value of c is not limited. c may be compensation data that corresponds to a display area currently compensated and that is sent by the AP 410.

In some other embodiments, the mapping relationship between the input gray level and the output gray level of the pixel aging compensation module 4212B may alternatively be represented as $f_6(x)=x+d$. In upward compensation processing, d is a positive number, and in downward compensation processing, d is a negative number. A specific value of d is not limited. d may be compensation data that corresponds to a display area currently compensated and that is sent by the AP 410. In some other embodiments, the mapping relationship between the input gray level and the output gray level of the pixel aging compensation module 4212B may alternatively be represented as $f(x)=cx+d$, and c and d may be compensation data that corresponds to display areas currently compensated and that is sent by the AP 410. The relationship between the input gray level and the output gray level of the pixel aging compensation module 4212B is not limited in this application.

However, it should be noted that, regardless of a value of the compensation data, the value range of the output gray level needs to be a preset range, for example, [0, 4095]. In addition, for upward compensation processing, the output gray level needs to be greater than the input gray level, and for downward compensation processing, the output gray level needs to be less than the input gray level. After partition aging compensation, display brightness of different display areas is the same.

It may be understood that, if the image and the compensation data sent by the AP 410 are directly sent to the pixel aging compensation module 4212B for processing, and are not processed by the data remapping module 4212A through gray level scale-down, when the first gray level of the image is high, it is likely that actual display brightness is still less than actual display brightness of another display area even if the gray level is compensated upward to the maximum value, and display effects of a plurality of display areas are different, for example, in a case in which an aging degree of a display area that needs to be compensated upward is high, the high aging degree may be reflected by low actual display brightness with a same gray level. For example, it is assumed that the value range of the first gray level of the image is [0, 4095], and when the gray level is 4095, the gray level corresponds to the preset first drive voltage (for example, 6.7 V). It is assumed that the first gray level is 4095, an aging degree of a first display area on the display panel 422 is high, actual display brightness corresponding to the first gray level is 850 nits, an aging degree of a second display area is low, and actual display brightness corresponding to the first gray level is 930 nits. To ensure that the actual display brightness of the first display area is consistent with that of the second display area, the brightness of the first display area may be compensated upward, and the brightness of the second display area may be compensated downward. However, because the first gray level is already the maximum value in this case, the gray level of the image in the first display area cannot be compensated upward. Therefore, only the gray level of the image in the second display area can be compensated downward, to enable the actual display brightness of the second display area to also be 850 nits, resulting in a high overall brightness loss of the display.

However, in this application, the image sent by the AP 410 is first processed by the data remapping module 4212A through gray level scale-down, and then the image after gray level scale-down and the compensation data are sent to the pixel aging compensation module 4212B for processing. A gray level of the image after the gray level scale-down is low, and gray level space for upward compensation is sufficient. The pixel aging compensation module 4212B may either compensate upward a display area at a high aging degree or compensate downward a display area at a low aging degree. Alternatively, the pixel aging compensation module 4212B may compensate upward a display area at a high aging degree and compensate downward a display area at a low aging degree simultaneously, to reduce a sacrifice of experience of overall brightness of the display while ensuring consistent display effects of the plurality of display areas. For example, it is assumed that a value range of a first gray level of the first image is [0, 4095], and when the gray level is 4095, the gray level corresponds to the preset first drive voltage (for example, 6.7 V). After being processed by the data remapping module 4212A, the first gray level of the first image is mapped to a second gray level, and a value range of the second gray level is [0,4000]. When the first gray level is the maximum value 4095, the mapped second gray level is the maximum value 4000. In this case, a drive voltage corresponding to the second gray level is the first drive voltage (for example, 6.7 V) corresponding to the original first gray level, and actual display brightness corresponding to the second gray level is also actual display brightness corresponding to the original first gray level. It is assumed that the first gray level is 4095, the first image is first processed by the data remapping module 4212A through gray level scale-down, and the first gray level is mapped to the second gray level, namely, 4000. The pixel aging compensation module 4212B performs partition compensation based on the first image with the second gray level. An aging degree of a first display area on the display panel 422 is high, the actual display brightness (which is also the actual display brightness corresponding to the original first gray level) corresponding to the second gray level is 850 nits, an aging degree of a second display area is low, and the actual display brightness (which is also the actual display brightness corresponding to the original first gray level) corresponding to the second gray level is 930 nits. To ensure that the actual display brightness of the first display area is consistent with that of the second display area, the brightness of the first display area may be compensated upward, and the brightness of the second display area may be compensated downward. The gray level of the first display area may be compensated upward to any value in gray level space of [4000, 4095]. It is assumed that a third gray level of an image in the first display area after compensation is 4095, and the third gray level is greater than the second gray level. Therefore, a drive voltage corresponding to the third gray level is greater than the first drive voltage corresponding to the second gray level (for example, the first drive voltage is 6.7 V, and the drive voltage corresponding to the third gray level is 7.5 V), and actual display brightness corresponding to the third gray level is also greater than the actual display brightness (850 nits) corresponding to the second gray level, which is assumed to be 900 nits. The display brightness of the second display area may alternatively be compensated downward to 900 nits. In this way, it is not only ensured that the display brightness of the first display area is consistent with that of the second display area, but also reduces a loss of screen brightness.

In some embodiments, the AP 410 may further send first indication information to the DDIC 421. The first indication information indicates locations of a plurality of display areas, which may also be referred to as that the first indication information includes location information of the plurality of display areas. Optionally, the location information of the plurality of display areas may be written into the pixel aging compensation module 4212B of the DDIC 421. For example, when sending the image and compensation data to the DDIC 421 for the first time, the AP 410 may send the location information of the plurality of display areas and respective corresponding address information together. Location information of any display area may be written into an address of corresponding address information in the pixel aging compensation module 4212B, and the pixel aging compensation module 4212B may determine the display area based on the location information of the display area. Any piece of compensation data may be written into an address of a corresponding display area, and the pixel aging compensation module 4212B may compensate the display area based on the compensation data written into the address of the display area.

In some embodiments, when sending a plurality of pieces of compensation data to the DDIC 421, the AP 410 sends second indication information. Information that is in the second indication information and that indicates any display area corresponds to one piece of compensation data. Optionally, the information that is in the second indication information and that indicates any display area may be information about an address in which the display area is stored in the pixel aging compensation module 4212B. Optionally, any piece of compensation data may be written into an address of a corresponding display area, and the pixel aging compensation module 4212B may compensate the display area based on the compensation data written into the address of any display area. For example, after the AP 410 sends the location information of the plurality of display areas to the DDIC 421, provided that the location information of the display areas remains unchanged, when subsequently sending the compensation data to the DDIC 421, the AP 410 may send only information about addresses in which the plurality of display areas are stored.

This is not limited to the foregoing enumerated cases. In some other embodiments, the first indication information and the second indication information may be sent together. This is not limited in this application.

It may be understood that, the AP may flexibly configure display areas with different compensation manners based on an actual situation, and an application scenario is wider.

It may be understood that one piece of compensation data in this application is used to compensate brightness of an image in a display area, and the one piece of compensation data is actually a type of compensation data, and may include at least one value, for example, the foregoing c and d.

It may be understood that the AP 410 may determine and send the compensation data based on an actual situation, and a compensation manner is flexible and effective. A value of the compensation data is used to determine whether a compensation manner is upward compensation or downward compensation. For example, for the display area at a high aging degree, upward compensation processing may be performed, to improve display brightness, and for the display area at a low aging degree, downward compensation processing may be performed, to reduce display brightness. This ensures that when the display panel 422 displays the image after partition compensation, the display effects of display areas with different aging degrees are consistent (for example, display brightness is consistent and colors are consistent), and reduces a sacrifice of the overall brightness as much as possible, and user experience is better. The aging degree may be reflected by actual display brightness with a same gray level. If the actual display brightness is low, the aging degree is high. If the actual display brightness is high, the aging degree is low. This is not limited thereto. The aging degree may alternatively be reflected by the statistical information. For example, when use duration is long and the temperature is high, the aging degree is high, and when the use duration is short and the temperature is low, the aging degree is low.

It may be understood that the compensation data sent by the AP 410 is further used to determine compensation precision. For example, a larger quantity of decimal places of the compensation data indicates higher compensation precision. The AP 410 may set compensation precision based on an actual situation, to avoid a problem like uneven gray level transition of an image after compensation caused by excessively low compensation precision, or a problem like excessively transmission burden of a communication interface and excessively heavy processing burden of the DDIC 421 caused by excessively high compensation precision.

In some embodiments, the AP 410 may send, to the DDIC 421, indication information indicates the mapping relationship between the input gray level and the output gray level of the data remapping module 4212A. In some embodiments, in different application scenarios, the indication information may indicate different mapping relationships.

For example, when the gray level of the image sent by the AP 410 is high, and there is the display area at a high aging degree on the display panel 422, a difference value between the output gray level and the input gray level may be set to a larger value (for example, the foregoing a is smaller, and the foregoing b is larger), a range of the gray level that can be compensated upward is wider, a range in which the display brightness can be increased is wider, and compensation is more flexible. In some other embodiments, the DDIC 421 may also preset the mapping relationship between the input gray level and the output gray level of the data remapping module 4212A.

In some embodiments, in FIG. 4A and FIG. 4B, in addition to a connection line between the communication interface 414 and the communication interface 4211, a connection line between other modules may be a data pipeline (data pipeline), and the data pipeline is used to transmit data and/or an instruction. In some embodiments, the data pipeline may be a unidirectional transmission data pipeline, for example, a data pipeline from the aging data statistics module 413A to the aging compensation module 413B, or a data pipeline from the data remapping module 4212A to the pixel aging compensation module 4212B. In some other embodiments, the data pipeline may be a bidirectional transmission data pipeline, for example, a data pipeline between the GPU 411 and the memory 412, or a data pipeline between the aging data statistics module 413A and the memory 412.

In some embodiments, after the AP 410 indicates the locations of the plurality of display areas to the pixel aging compensation module 4212B, the pixel aging compensation module 4212B may further divide the plurality of display areas, for example, divide any one of the display areas into a plurality of area blocks of which sizes are 4 pixels multiplied by 4 pixels, and then separately compensate areas obtained through further division. In some embodiments, the pixel aging compensation module 4212B may further process the plurality of pieces of compensation data sent by the AP 410, to determine compensation data respectively corresponding to the areas obtained through further division. Any piece of compensation data determined by the pixel aging compensation module 4212B may be used to compensate brightness of an image in the corresponding area obtained through division. For example, the pixel aging compensation module 4212B may include a demura (demura) module. The demura module may divide the display panel 422 into a plurality of areas by using an algorithm stored in the DDIC 421. Each area corresponds to one piece of compensation data. The demura module may adjust and correct the compensation data, to implement compensation for the plurality of areas, so that display effects of the entire display panel 422 are consistent.

This is not limited to the structures shown in FIG. 4A and FIG. 4B. In some other embodiments, the electronic device 100 may further include another module, for example, at least one module shown in FIG. 1.

In some embodiments, the location information of the display area may be represented by coordinates of the display area. A specific example is shown in FIG. 6.

Figure 6:
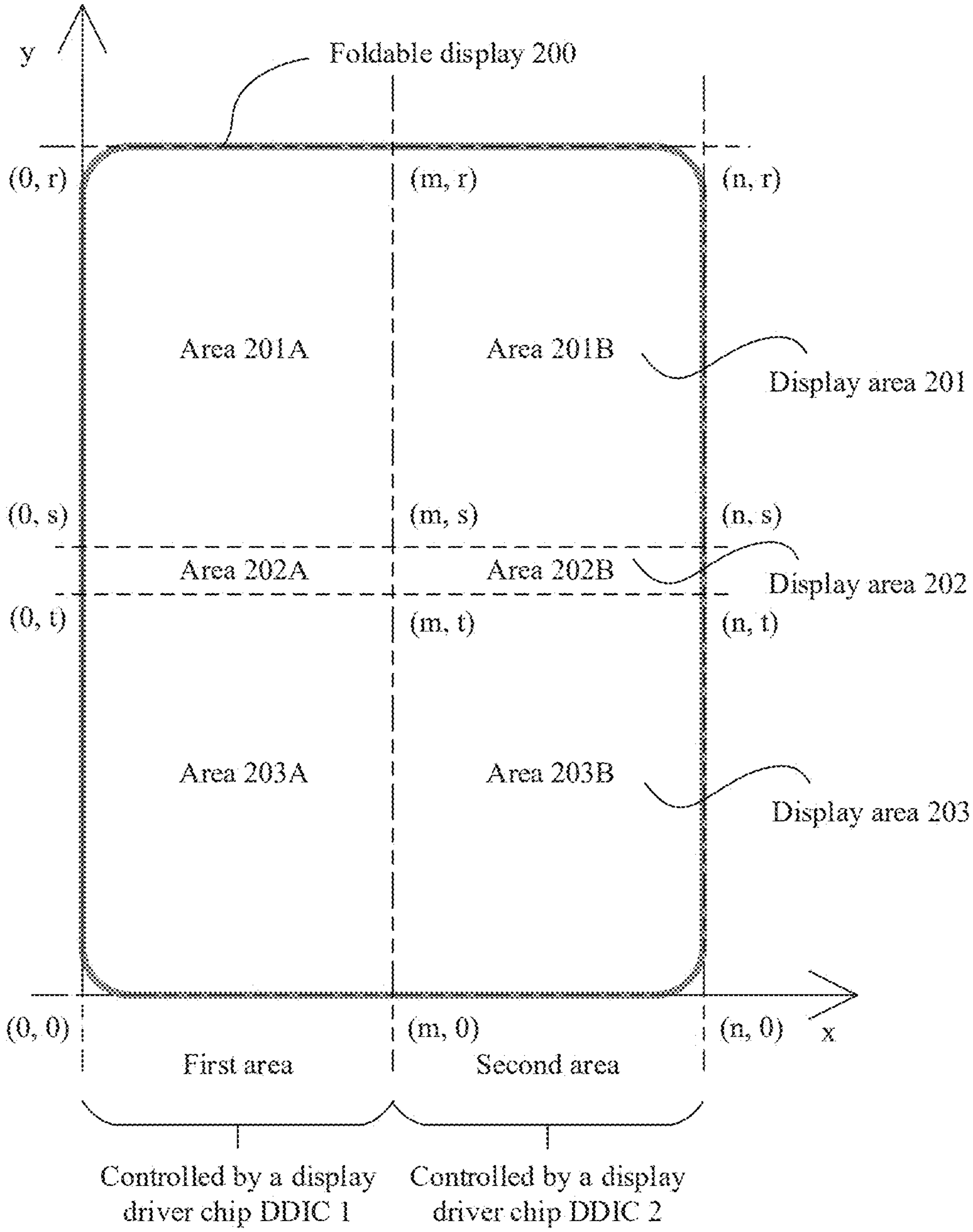
FIG. 6 is a schematic diagram of a location of a display area according to an embodiment of this application.

FIG. 6 is an example of a schematic diagram of a location of a display area. In FIG. 6, an example in which the display configured for the electronic device is the foldable display 200 shown in FIG. 2A is used for description.

As shown in FIG. 6, based on division from top to bottom, the foldable display 200 may include a display area 201, a display area 202, and a display area 203. Based on division from left to right, the foldable display 200 may include a first area and a second area. The first area may include a left area 201A in the display area 201, a left area 202A in the display area 202, and a left area 203A in the display area 203. The second area may include a right area 201B in the display area 201, a right area 202B in the display area 202, and a right area 203B in the display area 203.

In some embodiments, the first area of the foldable display 200 may be controlled by a DDIC 1 of the foldable display 200 to display, and the second area may be controlled by a DDIC 2 of the foldable display 200 to display. When a part or all of the first area and a part or all of the second area are jointly used to display an image, the DDIC 1 and the DDIC 2 need to control display simultaneously. For example, when the area 201A and the area 201B (the display area 201) are jointly used to display an image, the DDIC 1 controls the area 201A to display, and simultaneously the DDIC 2 controls the area 201B to display.

In some embodiments, the AP of the electronic device may send location information of the area 201A, the area 202A, and the area 203A to the DDIC 1, so that the DDIC 1 separately compensates the area 201A, the area 202A, and the area 203A with different aging degrees. The AP of the electronic device may send location information of the area 201B, the area 202B, and the area 203B to the DDIC 2, so that the DDIC 2 separately compensates the area 201B, the area 202B, and the area 203B with different aging degrees. Each area may be approximately a rectangle, and location information of each area may be represented by coordinates of two vertices of the rectangle. It should be noted that horizontal coordinates and vertical coordinates of the two vertices are different.

For example, the location information of each area may include coordinates of a vertex in the lower left corner and coordinates of a vertex in the upper right corner. The location information of the area 203A includes (0, 0) and (m, t), the location information of the area 202A includes (0, t) and (m, s), the location information of the area 203A includes (0, s) and (m, r), the location information of the area 203B includes (m, 0) and (n, t), the location information of the area 202B includes (m, t) and (n, s), and the location information of the area 201B includes (m, s) and (n, r). Herein, m, n, r, s, and t are all positive numbers, n is greater than m, r is greater than s, and s is greater than t.

In some embodiments, the DDIC 421 may control, by row, the display panel 422 to display an image, that is, the DDIC 421 sequentially controls an image to be displayed in each row on the display panel 422. For example, values of x and y are both integers, y may be understood as a row of the display panel 422 of the foldable display 200, y=r may be understood as the $1^{st}$ row in which the DDIC controls the display panel 422 to display, and y=0 may be understood as the last row in which the DDIC controls the display panel 422 to display. When the DDIC 1 and the DDIC 2 control the foldable display 200 to display an image, display starts from the $1^{st}$ row (y=r) and ends until the last row (y=0), which may be referred to as sequentially refreshing and displaying the image from the $1^{st}$ row to the last row.

This is not limited to the examples listed in FIG. 6. In some other examples, the foldable display 200 may include only the display area 201 and the display area 203, and the display area 202 is a curved line (for example, in the example shown in FIG. 6, s is equal to t). In this case, the location information of each area may include only coordinates of a vertex in the upper right corner. In some other examples, the display area may alternatively be approximately in another shape, for example, a circle. In this case, the location information may include coordinates and a radius (or a diameter) of the circle center. A specific representation manner of the location information of the display area is not limited in this application.

In some embodiments, when the DDIC 421 performs partition compensation on the plurality of display areas and controls the display panel 422 to display an image, the DDIC 421 may not compensate the plurality of display areas and obtain a compensated image before controlling the image to be displayed in the $1^{st}$ row of the display panel 422, but before controlling the image to be displayed in the $1^{st}$ row of any display area of the display panel 422, compensates the display area and obtains the compensated image that needs to be displayed in the display area. For example, it is assumed that the display configured for the electronic device is the foldable display 200 shown in FIG. 6. The DDIC 1 controls display of the first area, and the DDIC 2 controls display of the second area, so that the first area and the second area display one frame of image. Specifically, before the DDIC 1 refreshes and displays the image in the $1^{st}$ row (y=r) of the area 201A, compensation data A corresponding to the area 201A takes effect, that is, the DDIC 1 compensates the area 201A based on the compensation data A, and obtains a compensated image. Then, the DDIC 1 sequentially refreshes and displays the compensated image from the $1^{st}$ row (y=r) to the last row (y=(s−1)) of the area 201A. Similarly, before the DDIC 1 refreshes and displays the image in the $1^{st}$ row (y=s) of the area 202A, for example, when the DDIC 1 refreshes and displays the image in any row from the $1^{st}$ row (y=r) to the last row (y=(s−1)) of the area 201A, compensation data B corresponding to the area 202A takes effect, that is, the DDIC 1 compensates the area 202A based on the compensation data B and obtains a compensated image. Then, the DDIC 1 sequentially refreshes and displays the compensated image from the $1^{st}$ row (y=s) to the last row (y=(t−1)) of the area 202A. Before the DDIC 1 refreshes and displays the image in the $1^{st}$ row (y=t) of the area 203A, for example, when the DDIC 1 refreshes and displays the image in any row from the row corresponding to y=r to the row corresponding to y=(t−1), compensation data C corresponding to the area 203A takes effect, that is, the DDIC 1 compensates the area 203A based on the compensation data C. Then, the DDIC 1 sequentially refreshes and displays the compensated image from the $1^{st}$ row (y=t) to the last row (y=0) of the area 203A. A process in which the DDIC 2 controls display of the second area is similar to this. However, it should be noted that when the first area and the second area display an image jointly, the process in which the DDIC 1 controls display of the first area and the process in which the DDIC 2 controls display of the second area are performed simultaneously. For example, when the DDIC 1 controls display in the $1^{st}$ row (y=r) of the area 201A, the DDIC 2 also controls display in the $1^{st}$ row (y=r) of the area 201B. In this way, compensation data takes effect in a partition manner, to avoid a case in which when an amount of the compensation data is large, compensation data of the plurality of display areas simultaneously takes effect in a frame header (for example, the $1^{st}$ row corresponding to y=r) of a next frame, resulting in a processing exception caused by excessively high processing pressure of the DDIC.

This is not limited to the examples listed above. In some other embodiments, a value range of the gray level may be another value, for example, [0, 255]. This is not limited in this application.

Based on the foregoing embodiments, the following describes a partition compensation method provided in an embodiment of this application.

Figure 7:
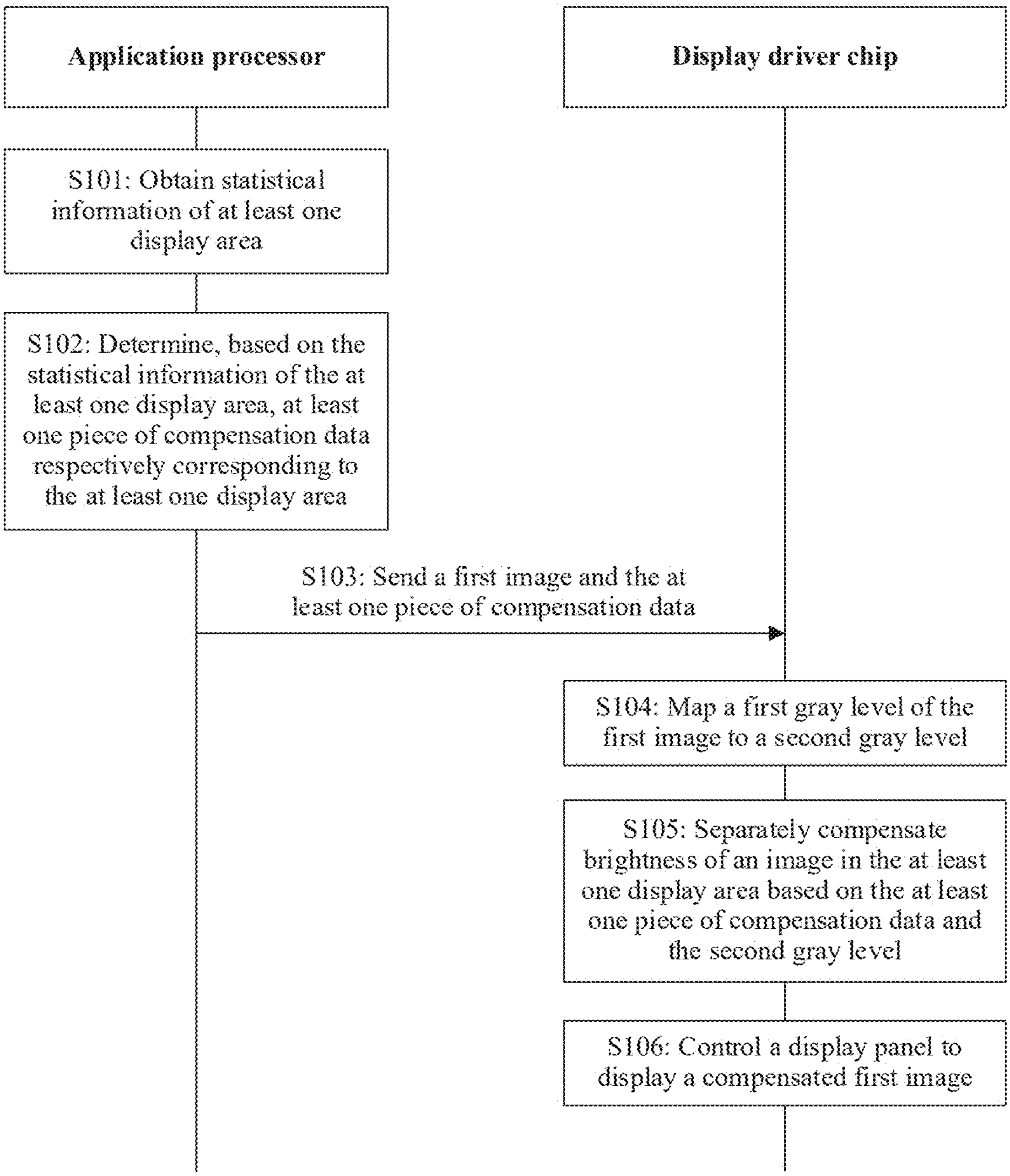
FIG. 7 is a schematic flowchart of a partition compensation method according to an embodiment of this application.

FIG. 7 is a schematic flowchart of a partition compensation method according to an embodiment of this application. The method may be applied to the electronic device 100 shown in FIG. 1. The method may be applied to the electronic device shown in FIG. 2A to FIG. 2C. The method may be applied to the electronic device 100 shown in FIG. 4A and FIG. 4B. The method may include but is not limited to the following steps.

S101: An application processor AP obtains statistical information of at least one display area.

Specifically, when displaying an image on a display panel of a display, the AP may obtain statistical information of different pixels in the at least one display area in real time, for example, separately obtain statistical information of an R pixel, a G pixel, and a B pixel. The statistical information includes, for example, but is not limited to, lighting duration (display duration), display brightness, and a temperature.

S102: The AP determines, based on the statistical information of the at least one display area, at least one piece of compensation data respectively corresponding to the at least one display area.

In some embodiments, the AP may determine, at an interval of a preset time period and based on the statistical information of the at least one display area that is obtained within the preset time period, the at least one piece of compensation data respectively corresponding to the at least one display area.

S103: The AP sends a first image and the at least one piece of compensation data to a display driver chip DDIC.

Specifically, the at least one piece of compensation data is respectively used to compensate an image in at least one display area of the first image, that is, adjust brightness of the image, and any piece of compensation data is used to compensate an image in a corresponding display area of the first image.

The at least one display area is an upper part or all of the display area of the display.

S104: The DDIC maps a first gray level of the first image to a second gray level.

Specifically, the second gray level is less than the first gray level. For an example of a mapping process, refer to FIG. 5A. The first gray level is an input gray level, and the second gray level is an output gray level. In some embodiments, the DDIC may determine a mapping relationship between the first gray level and the second gray level based on indication information sent by the AP, and reduce the gray level of the first image based on the mapping relationship. For an example of the mapping relationship, refer to $f_2(x)$ shown in FIG. 5A. In some embodiments, the DDIC maps, to a drive voltage corresponding to the second gray level, a drive voltage corresponding to the first gray level.

S105: The DDIC separately compensates brightness of the image in the at least one display area based on the at least one piece of compensation data and the second gray level.

Specifically, the DDIC may adjust brightness of an image in a first display area based on first compensation data in the at least one piece of compensation data and the second gray level. The first display area is any one of the at least one display area, and the first compensation data is compensation data corresponding to the first display area. The foregoing process may be understood as implementing partition compensation.

For example, a relationship between the gray level f(x) of the image after compensation and the gray level x of the image before compensation may be represented by f(x)=cx+ d, where c and d may be compensation data that is sent by the AP and that corresponds to the display areas currently compensated.

In some embodiments, the DDIC may perform upward compensation processing based on the compensation data sent by the AP. For example, upward compensation processing is performed on an area of which aging degree is greater than a preset threshold, and a gray level of an image in a display area after upward compensation is higher than a gray level (the second gray level) of an image in a display area before upward compensation. For a specific example, refer to FIG. 5B. In some other embodiments, the DDIC may perform downward compensation processing based on the compensation data sent by the AP. For example, downward compensation processing is performed on an area of which aging degree is less than or equal to a preset threshold, and a gray level of an image in a display area after downward compensation is lower than a gray level (the second gray level) of an image in a display area before downward compensation. For a specific example, refer to FIG. SC.

In some embodiments, the aging degree may be reflected by actual display brightness with a same gray level. If the actual display brightness is low, the aging degree is high. If the actual display brightness is high, the aging degree is low. This is not limited thereto. The aging degree may alternatively be reflected by the statistical information. For example, when use duration is long and the temperature is high, the aging degree is high, and when the use duration is short and the temperature is low, the aging degree is low.

In some embodiments, that brightness of an image in the first display area with the first gray level is lower than brightness of an image in the second display area with the first gray level, which may also be referred to as that an aging degree of the first display area is higher than an aging degree of the second display area. The DDIC may perform upward compensation processing on the first display area, and perform downward compensation processing on the second display area. A gray level of an image in the first display area after compensation is greater than the second gray level, a gray level of an image in the second display area after compensation is less than the second gray level.

In some embodiments, the DDIC may further receive first indication information sent by the AP. The first indication information indicates a location of the at least one display area, which may also be referred to as that the first indication information includes location information of the at least one display area. For an example of the location information, refer to FIG. 6.

In some embodiments, when receiving the at least one piece of compensation data sent by the AP, the DDIC may receive second indication information sent by the AP. Information that is in the second indication information and that indicates any display area corresponds to one piece of compensation data. Optionally, the information that is in the second indication information and that indicates any display area may be information about an address in which the display area is stored in the DDIC. Optionally, any piece of compensation data may be written into an address of a corresponding display area stored in the DDIC, and the DDIC may compensate the display area based on the compensation data written into the address of any display area.

This is not limited to the foregoing enumerated cases. In some other embodiments, the first indication information and the second indication information may be sent together. This is not limited in this application.

In some embodiments, the at least one display area is divided according to a preset rule. For example, the at least one display area includes display areas with different aging degrees.

S106: The DDIC controls the display panel to display a compensated first image.

In some embodiments, the DDIC may sequentially refresh and display, from the $1^{st}$ row to the last row of any display area of the at least one display area, a compensated image in the display area.

In some embodiments, before refreshing and displaying the compensated image in the $1^{st}$ row of any display area, the DDIC may compensate the image in the display area based on compensation data corresponding to the display area, instead of compensating, by using the at least one piece of compensation data, the at least one display area before refreshing and display is performed in the $1^{st}$ row of a display area in which refreshing and display is first performed. For a specific example, refer to the descriptions of compensating the display area before controlling an image to be displayed in the $1^{st}$ row of the display area on the display panel 422, and obtaining the compensated image that needs to be displayed in the display area. This can avoid a case in which when an amount of compensation data is large, before an image is controlled to be displayed in the $1^{st}$ row of the display panel, the at least one display area is compensated simultaneously, resulting in a processing exception caused by excessively high processing pressure of the DDIC. In this case, S105 and S106 may be performed simultaneously.

It may be understood that, in the compensated first image, display effects of different display areas are the same, for example, colors and brightness are the same.

It may be understood that gray levels of a plurality of pixels in a frame of image may be different, and the first gray level of the first image may be understood as a first gray level of any pixel. Compensating the display area may be understood as compensating brightness of each pixel of an image in the display area.

This is not limited to the compensation manner in the foregoing example. In some other embodiments, the DDIC may further perform compensation by adjusting a drive voltage for controlling display of the display area. Upward compensation may be increasing the drive voltage, and downward compensation may be decreasing the drive voltage. The drive voltage is related to the display brightness. For example, a higher drive voltage indicates higher display brightness. The drive voltage is related to the gray level. For example, a larger gray level indicates a larger corresponding drive voltage. A specific compensation manner is not limited in this application.

In the method shown in FIG. 7, the DDIC first maps, to the smaller second gray level, the first gray level of the first image sent by the AP, and then separately compensates the at least one display area of the first image with the second gray level. Compensation manners of different display areas may be different. For example, a display area at a high aging degree may be compensated upward, and a display area at a low aging degree may be compensated downward. This makes the compensation manner more flexible. In addition, even if the original first gray level of the first image is high, upward compensation may be performed to ensure a consistent display effect of the at least one display area, to avoid a case in which only downward compensation can be performed, resulting in a large sacrifice of overall brightness of the screen. In this way, an application scope is wider.

This is not limited thereto. The AP in this application may be replaced with another processing chip or processing unit like a SoC. In some embodiments, the AP may be integrated into the another processing chip or processing unit like the SoC. In some other embodiments, the AP is independent of the another processing chip or processing unit like the SoC.

This is not limited thereto. The DDIC in this application may alternatively be replaced with a driver chip or a processing unit inside another display. In some embodiments, the driver chip or the processing unit inside the another display may be integrated with a DDIC. In some other embodiments, the DDIC may be independent of the driver chip or the processing unit inside the another display.

One or more of the foregoing modules or units may be implemented by using software, hardware, or a combination thereof.

When any one of the foregoing modules or units is implemented by using software, the software exists in a form of computer program instructions, and is stored in a memory. A processor may be configured to execute the program instructions to implement the foregoing method procedures. The processor may include but is not limited to, at least one of the following types: a central processing unit (central processing unit, CPU), a microprocessor, a digital signal processor (DSP), a microcontroller unit (microcontroller unit, MCU), and a computing device used for running software like an artificial intelligence processor. Each computing device may include one or more cores used to execute software instructions to perform operations or processing. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form a SoC (system-on-a-chip). Alternatively, the processor may be integrated into an ASIC as a built-in processor of the ASIC, and the ASIC integrated with the processor may be independently packaged or may be packaged with another circuit. In addition to the core configured to execute software instructions to perform an operation or perform processing, the processor may further include a necessary hardware accelerator, for example, a field programmable gate array (field programmable gate array, FPGA), a PLD (programmable logic device), or a logic circuit that implements a dedicated logic operation.

When the foregoing modules or units are implemented by hardware, the hardware may be any one of or any combination of a CPU, a microprocessor, a DSP, an MCU, an artificial intelligence processor, an ASIC, a SoC, an FPGA, a PLD, a dedicated digital circuit, a hardware accelerator, or a non-integrated discrete device. The hardware may run necessary software or without software to execute the foregoing method procedure.

What is claimed is:

1. An electronic device, comprising:
- one or more processors configured to send a first image and first compensation data; and
- a display, coupled with the one or more processors, and comprising:
  - a display driver chip configured to:
    - receive the first image and first compensation data;
    - map a first gray level of the first image to a second gray level, wherein the second gray level is less than the first gray level; and
    - adjust a first brightness of a second image in a first display area of the first image based on first compensation data and the second gray level to obtain an adjusted second image, wherein adjusting the first brightness comprises setting, based on the second gray level and the first compensation data, a gray level of the second image in the first display area to a third gray level, and wherein the third gray level is based on the second gray level and the first compensation data; and
  - a display panel configured to display the adjusted second image in the first display area.

2. The electronic device of claim 1, wherein the one or more processors are further configured to send second compensation data to the display driver chip, wherein the display driver chip is further configured to adjust a second brightness of a third image in a second display area of the first image based on the second compensation data and the second gray level to obtain an adjusted third image, and wherein the display panel is further configured to display, in the second display area, the adjusted third image.

3. The electronic device of claim 2, wherein the display panel is further configured to further display the adjusted second image in the first display area by sequentially refreshing and displaying, from a first row to a last row of the first display area, the adjusted second image, and wherein the display panel is further configured to further display the adjusted third image in the second display area.

4. The electronic device of claim 2, wherein the first brightness is less than the second brightness, wherein a gray level of the adjusted second image is greater than the second gray level, and wherein a gray level of the adjusted third image is less than the second gray level.

5. The electronic device of claim 1, wherein the display driver chip is further configured to further adjust the first brightness by setting, based on the second gray level and the first compensation data, a gray level of the second image in the first display area to a third gray level.

6. The electronic device of claim 1, wherein the one or more processors are further configured to send first indication information to the display driver chip, and wherein the first indication information comprises a location of the first display area.

7. The electronic device of claim 1, wherein the one or more processors are further configured to send second indication information to the display driver chip, and wherein the second indication information comprises information that the first display area and that corresponds to the first compensation data.

8. The electronic device of claim 1, wherein when the display panel displays an image the one or more processors are further configured to:
- obtain statistical information of the first display area; and
- determine the first compensation data based on the statistical information of the first display area, wherein the statistical information comprises at least one of a display duration, a display brightness, or a temperature.

9. The electronic device of claim 1, wherein mapping the first gray level to the second gray level comprises mapping the first gray level to the second gray level based on a first mapping relationship, and wherein the first mapping relationship is preset.

10. A communication apparatus, comprising:
- a communication interface configured to receive a first image and first compensation data;
- a display panel; and
- one or more processors coupled to the communication interface and the display panel and configured to:

map a first gray level of the first image to a second gray level, wherein the second gray level is less than the first gray level;

adjust a first brightness of a second image in a first display area of the first image based on the first compensation data and the second gray level to obtain an adjusted second image, wherein adjusting the first brightness comprises setting, based on the second gray level and the first compensation data, a gray level of the second image in the first display area to a third gray level, wherein the third gray level is based on the second gray level and the first compensation data; and control the display panel to display the adjusted second image in the first display area.

11. The communication apparatus of claim 10, wherein the communication interface is further configured to receive a location of the first display area.

12. The communication apparatus of claim 10, wherein the communication interface is further configured to receive a first display area that corresponds to the first compensation data.

13. The communication apparatus of claim 10, wherein the one or more processors are further configured to, when the display panel displays an image, obtain statistical information of the first display area, and determine the first compensation data based on the statistical information of the first display area, wherein the statistical information comprises at least one of a display duration, a display brightness, or a temperature.

14. The communication apparatus of claim 10, wherein mapping the first gray level of the first image to the second gray level comprises mapping the first gray level of the first image to the second gray level based on a first mapping relationship.

15. The communication apparatus of claim 10, wherein the communication interface is further configured to receive a location of the first display area.

16. The communication apparatus of claim 10, wherein the communication interface is further configured to receive a first display area that corresponds to the first compensation data.

17. The communication apparatus of claim 10, wherein the one or more processors are further configured to, when the display panel displays an image, obtain statistical information of the first display area, and determine the first compensation data based on the statistical information of the first display area, wherein the statistical information comprises at least one of a display duration, a display brightness, or a temperature.

18. The communication apparatus of claim 10, wherein mapping the first gray level of the first image to the second gray level comprises mapping the first gray level of the first image to the second gray level based on a first mapping relationship.

19. A partition compensation method comprising:

receiving a first image and first compensation data;

mapping a first gray level of the first image to a second gray level, wherein the second gray level is less than the first gray level;

adjusting a first brightness of a second image in a first display area of the first image based on the first compensation data and the second gray level to obtain an adjusted second image, wherein adjusting the first brightness comprises setting, based on the second gray level and the first compensation data, a gray level of the second image in the first display area to a third gray level, wherein the third gray level is based on the second gray level and the first compensation data; and displaying the adjusted second image in the first display area.

20. The partition compensation method of claim 19, further comprising:

receiving second compensation data;

adjusting, based on the second compensation data and the second gray level, a second brightness of a third image in a second display area of the first image to obtain an adjusted third image; and displaying the adjusted third image in the second display area.

21. The partition compensation method of claim 20, further comprising:

displaying, in the first display area, the adjusted second image comprises by sequentially refreshing and displaying, from a first row to a last row of the first display area, the adjusted second image; and further displaying the adjusted third image in the second display area.

22. The partition compensation method of claim 20, wherein the first brightness is less than the second brightness, wherein a gray level of the adjusted second image is greater than the second gray level, and wherein a gray level of the adjusted third image is less than the second gray level.

23. The partition compensation method of claim 19, comprising further adjusting the first brightness by setting, based on the second gray level and the first compensation data, a gray level of the second image in the first display area to a third gray level.

24. The partition compensation method of claim 19, further comprising receiving a location of the first display area.

* * * * *